United States Patent [19]

Machida

[11] Patent Number: 5,461,595
[45] Date of Patent: Oct. 24, 1995

[54] DOUBLE-LAYER MAGNETO-OPTICAL RECORDING METHOD WITHOUT USING AN INITIAL MAGNETIC FIELD

[75] Inventor: Hajime Machida, Tokyo, Japan

[73] Assignee: Ricoh Company, Ltd., Tokyo, Japan

[21] Appl. No.: 173,913

[22] Filed: Dec. 27, 1993

Related U.S. Application Data

[62] Division of Ser. No. 948,452, Sep. 21, 1992, abandoned, which is a continuation of Ser. No. 429,060, Oct. 30, 1989, abandoned.

[30] Foreign Application Priority Data

| Nov. 4, 1988 | [JP] | Japan | 63-280058 |
| Dec. 21, 1988 | [JP] | Japan | 63-322944 |
| Jul. 28, 1989 | [JP] | Japan | 1-196249 |
| Oct. 9, 1989 | [JP] | Japan | 1-263765 |

[51] Int. Cl.$^6$ ................................ G11B 13/04
[52] U.S. Cl. ............................ 369/13; 360/59
[58] Field of Search .............. 369/13, 14, 275.2, 369/110; 360/59, 114; 365/122; 428/694 ML, 694 MM, 694 R

[56] References Cited

U.S. PATENT DOCUMENTS

| 4,855,975 | 8/1989 | Akasaka et al. | 369/13 |
| 4,878,132 | 10/1989 | Aratani et al. | 369/13 |
| 4,882,718 | 11/1989 | Kryder et al. | 369/13 |
| 4,910,622 | 3/1990 | Saito et al. | 369/13 |
| 4,955,007 | 9/1990 | Aratani et al. | 369/13 |

*Primary Examiner*—Georgia Y. Epps
*Assistant Examiner*—Tan Dinh
*Attorney, Agent, or Firm*—Cooper & Dunham

[57] ABSTRACT

A method of magneto-optical recording and overwriting information onto a double-layer magneto-optical recording medium which has laminated first and second magnetic layers having different coercive forces at a lower operation temperature and a higher operation temperature of which one is a recording operation temperature and the other is an erasing operation temperature, without using an initializing external magnetic field. The method includes the steps of recording by applying a laser beam to an area of the recording medium at a power level corresponding to one of these operating temperatures and erasing by applying a laser beam to an area of the recording medium at a different power level corresponding to the other of the operating temperatures, while applying a bias magnetic field to the magneto-optical recording medium with the same magnetization direction during both recording and erasing, the intensity of the bias magnetic field being greater than the coercive forces of the first and second magnetic layers at the lower operation temperature.

16 Claims, 11 Drawing Sheets

F I G. 1
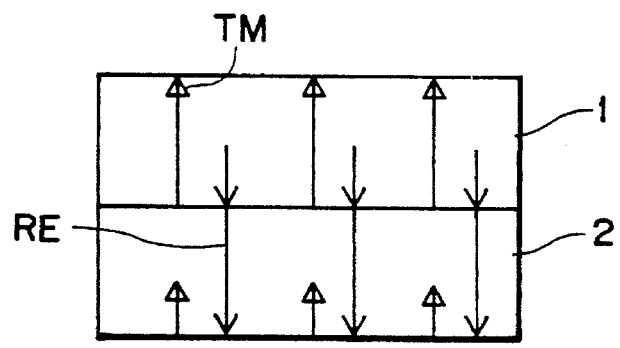
F I G. 2
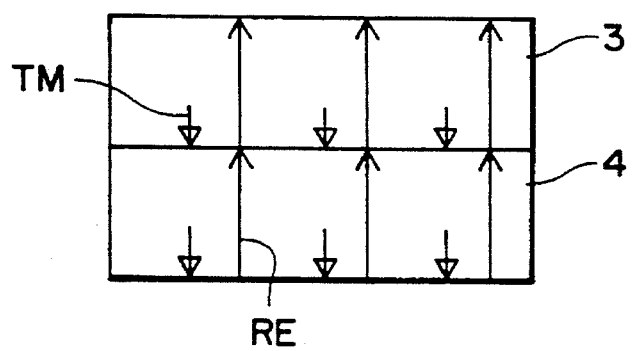
F I G. 3
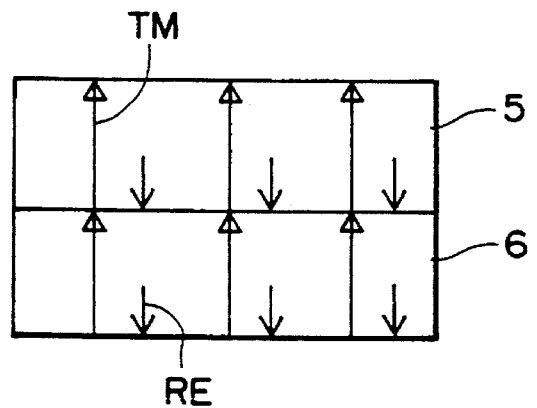

F I G. 16
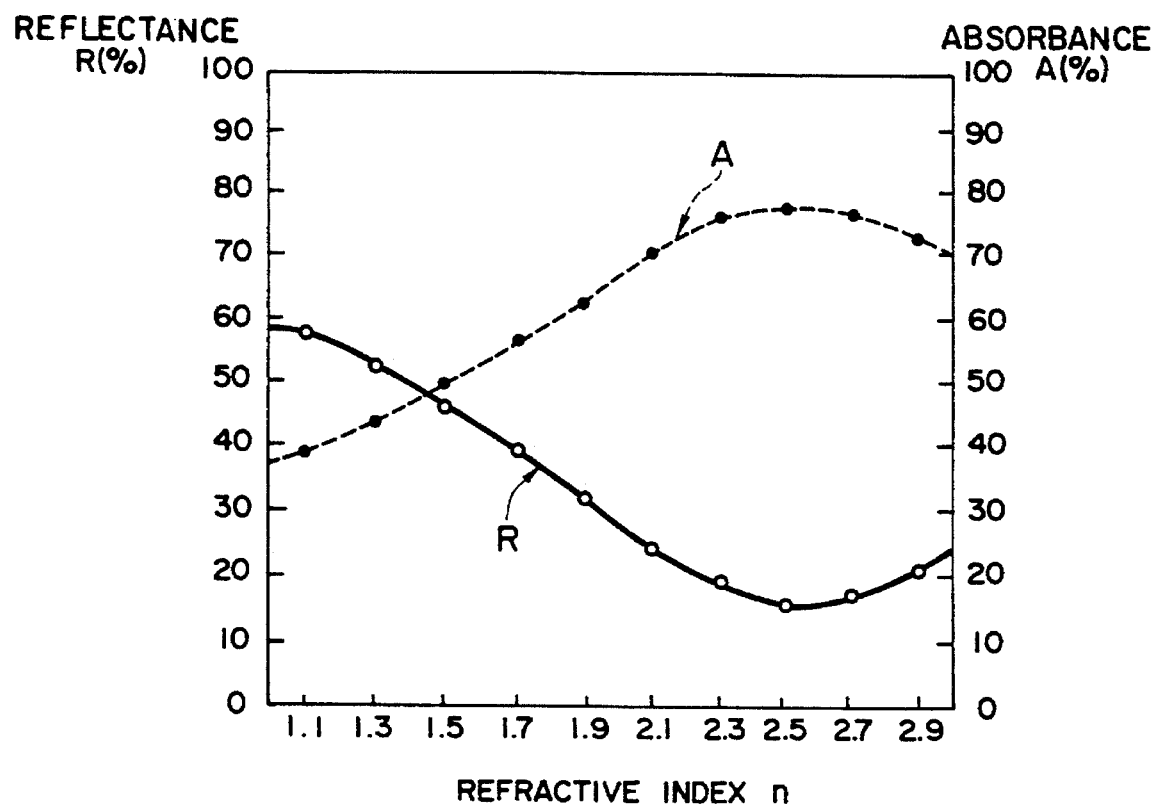
F I G. 17
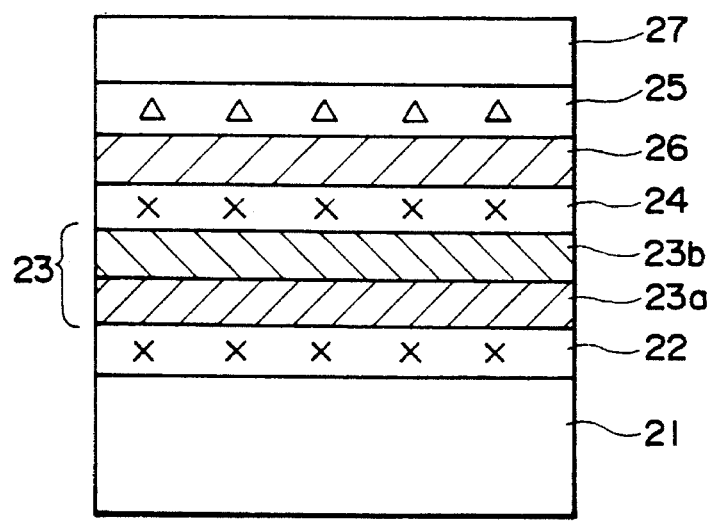

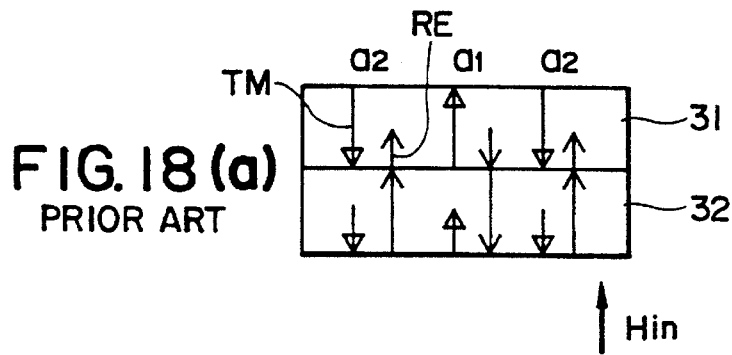
FIG. 18(a) PRIOR ART
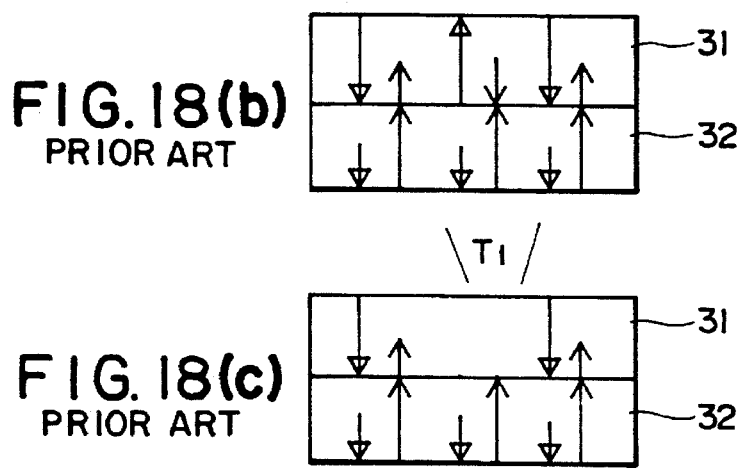
FIG. 18(b) PRIOR ART
FIG. 18(c) PRIOR ART
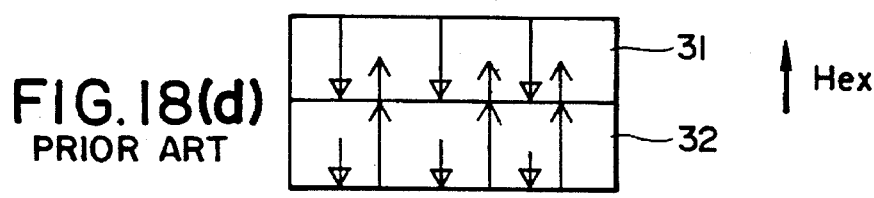
FIG. 18(d) PRIOR ART
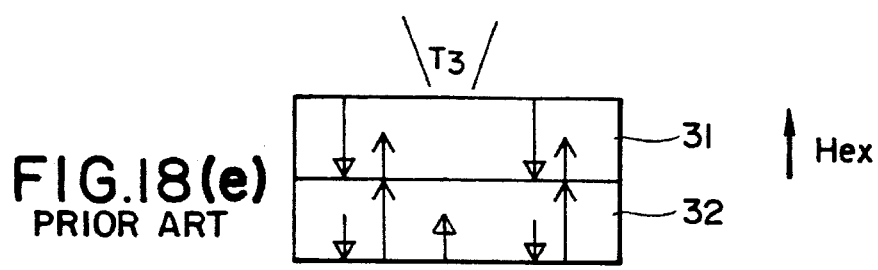
FIG. 18(e) PRIOR ART
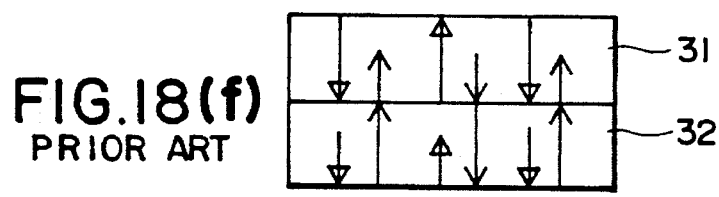
FIG. 18(f) PRIOR ART

DOUBLE-LAYER MAGNETO-OPTICAL RECORDING METHOD WITHOUT USING AN INITIAL MAGNETIC FIELD

This is a division of application Ser. No. 948,452, filed Sep. 21, 1992 and now abandoned, which is a continuation of application Ser. No. 429,060, filed Oct. 30, 1989 and now abandoned.

BACKGROUND OF THE INVENTION

1. Field of the Invention

The present invention relates to a magneto-optical recording method capable of performing an overwrite operation, and a magneto-optical recording medium for use in the above magneto-optical recording method.

2. Discussion of Background

Since laser beams are employed when information is recorded in or reproduced from a magneto-optical recording medium, as in conventional optical recording media, not only an enormous volume of information can be recorded, but also overwriting is possible. In addition to the above, recording and reproduction of information can be performed with a magnetic recording head being out of contact with the recording medium, so that the recording medium is protected from dusts. The magneto-optical recording medium is thus quite stable in recording and reproduction performance.

Studies are now being made on such magneto-optical recording media by placing great emphasis on its utilization for filing documents, and video and motionless pictures; and for computer memories. Substitution of the magneto-optical recording medium for a floppy disk or hard disk is also highly expected, and commercialization thereof will be achieved in the near future.

A variety of magnetic films are proposed for a recording layer of the above-mentioned magneto-optical recording medium. These magnetic films are made of amorphous magnetic alloys such as TbFe, TbFeCo, GdTbFeCo and NdDyFeCo, using transition metals such as Fe and Co and rare earth metals such as Gd, Dy, Tb and Nd in combination. In the magneto-optical recording media using the above-mentioned magnetic alloy layers, noise as caused by boundaries of crystals in the media is minimal by virtue of the amorphous state thereof. Furthermore, the above amorphous magnetic alloy layers can be easily formed on a substrate by sputtering or vacuum-deposition in the form of a vertically magnetized layer.

As the recent progress of the recording speed and density in the field of information recording, a demand for a magneto-optical recording medium which has further improved magneto-optical characteristics such as Curie temperature (Tc), coercive force (Hc) and Kerr rotation angle ($\Theta$k). To obtain the improved magneto-optical recording medium, materials for the magneto-optical recording medium have been developed and the recording layers of the recording medium have been improved. For instance, there are proposed function-separating type magneto-optical recording media having a two-layered recording layer in Japanese Laid-Open Patent Applications 56-153546, 57-78652, 60-177455 and 63-153752. More specifically, this function-separating type magneto-optical recording medium comprises two recording layers, which are separately capable of recording and reproducing information.

In the magneto-optical recording medium, a light modulation method is generally employed for recording and erasing information. In the light modulation method, information signals are modulated by laser beams, and a bias magnetic field is applied to the recording medium, with its direction changed, depending on the recording and erasing operations.

Unlike the recording method employed in a hard disk, the above-mentioned light modulation method is not capable of overwriting information. To record some information in an area where other information has been already recorded therein, two steps, that is, first, an erasing operation with respect to the previously recorded information and then a recording operation of new information, are required. In this recording method, the disadvantageous prolongation of the access time is inevitable.

To solve the above-mentioned problem, the applicant of the present application has proposed a magnetic field modulation method, as disclosed in Japanese Laid-Open Patent Application 57-113402. According to this magnetic field modulation method, an information signal is modulated by a magnetic field generated by a magnetic head, and provided to a magneto-optical recording medium, with laser beams continuously applied thereto. This magnetic field modulation method is capable of overwriting information, just like the recording method as employed in a hard disk.

From the viewpoint of substitution of the magneto-optical recording medium for a hard disk, the magneto-optical recording medium is required to record information as quickly as, or more quickly than the hard disk, for example, at a disk rotation speed of 3600 rpm and a linear velocity of 22 m/sec or more.

To record information at such a high speed, however, there are the following drawbacks in the magneto-optical recording medium employing the above-mentioned magnetic field modulation method:

1. It will be necessary to reverse the direction of the magnetic field generated by the magnetic head at a frequency as high as 15 MHz or more in accordance with the recording and erasing operations. This is considered to be practically difficult.

2. To reverse the magnetization direction of the vertically magnetized recording layer of the magneto-optical recording medium, a magnetic field with an intensity of as great as 200 to 300 Oe is required. In order to obtain the magnetic field with this intensity, the magnetic head must be floated so as to be almost in contact with the magneto-optical recording medium, which produces problems of wear and damage to both the magnetic head and the magneto-optical recording medium, and impairs the reliability of this magneto-optical recording method.

3. When information is recorded at high frequency, recording bits are affected by the heat conduction and thermal magnetic recording characteristics of the magneto-optical recording medium and thus shaped like a crescent-form leaving a trail. This causes noise in the course of reproduction and degrades the C/N ratio.

To eliminate the above-mentioned drawbacks, there is proposed a recording method capable of performing the overwrite operation by changing the light intensity of a single laser beam, as shown in Japanese Laid-Open Patent Application 62-175948 and in National Convention Record p.721,28P-ZL-3 of The Institute of Applied Physics held in 1987.

According to the magneto-optical recording method described in the above references, a magneto-optical recording medium which comprises a two-layered, ferrimagnetic coupling type recording layer consisting of a memory layer and an auxiliary layer is used. This method employs the light intensity modulation method and necessitates an auxiliary magnet for initializing the recording medium. The process of the overwrite operation according to this magneto-optical recording method will be now explained in detail by referring to FIGS. 18 and 19.

The magneto-optical recording medium used in this method comprises a memory layer 31 and an auxiliary layer 32 as shown in FIG. 18(a). The memory layer 31 is made of an amorphous magnetic alloy, such as TbFeCo, comprising transition metals and rare earth metals in combination. In the memory layer 31, the magnetic moment of the employed transition metals is predominant over that of the rare earth metals at room temperature, the coercive force (Hc) is great, and the Curie Temperature (Tc) is low. On the other hand, the auxiliary layer 32 is made of an amorphous magnetic alloy, such as TbDyFeCo, comprising transition metals and rare earth metals in combination. In the auxiliary layer 32, the magnetic moment of the employed rare earth metals is predominant over that of the transition metals at room temperature, the coercive force (Hc) is small, and the Curie Temperature (Tc) is high. In FIG. 18(a), $a_1$ indicates a recorded area where information is recorded therein and $a_2$ indicates an erased area where information is erased therefrom. The thermal magnetic characteristics of each amorphous magnetic alloy layer of the memory layer 31 and the auxiliary layer 32 are shown in FIG. 19. In FIG. 19, Hex indicates a bias magnetic field, and $T_1$ and $T_3$ indicate the operation temperatures for erasing and recording information, respectively.

An initializing magnetic field Hin of 6 to 7 KOe is applied by an auxiliary magnet for initialization to a recording medium in which information has been recorded and erased as shown in FIG. 18(a) by a laser-beam-light-intensity modulation method. Since the portion of the auxiliary layer 32 in the recorded area $a_1$ has a low coercive force at room temperature, only the magnetization direction of the portion of the auxiliary layer 32 in the recorded area $a_1$ is reversed in the direction of the magnetic field for initialization as shown in FIG. 18(b). When a bias magnetic field Hex is applied to the recording medium in an upward vertical direction in the above-mentioned state, and a laser beam having a small power is applied thereto to increase the temperature thereof to a temperature $(T_1)$, the coercive force of the portion of the memory layer 31 in the recorded area $a_1$ is drastically decreased as shown in FIG. 18(c). As a result, the magnetized direction of the portion of the memory layer 31 in the recorded area $a_1$ is reversed by the exchange bonding action with the auxiliary layer 31. When the temperature is decreased in such a state, the recorded information in the recorded area $a_1$ is erased as shown in FIG. 18(d). Starting from the state as shown in FIG. 18(d), when a laser beam having a large power is applied and the temperature of the auxiliary layer 32 is increased to a temperature $T_3$ which is higher than the compensation temperature Tcomp thereof, the magnetization of the memory layer 31 is lost. Since the coercive force Hc of the auxiliary layer 32 is smaller than the intensity of the bias magnetic field Hex, the magnetization direction of the auxiliary layer 32 is reversed in the direction of the bias magnetic field Hex as shown in FIG. 18(e). When the temperature is lowered to room temperature in such a state, recording can be done as shown in FIG. 18(f).

However, the above-mentioned magneto-optical recording method includes the step of initializing the magnetization direction in the memory layer 31 and the auxiliary layer 32 by applying a magnetic field thereto with an intensity as great as about 6 kOe, prior to the recording and erasing operations. This initializing step requires a permanent magnet or an electromagnet, which makes it difficult to minimize the size of a magneto-optical head. Furthermore, the process of recording and erasing information is so complicated that it is considered to be difficult to put this magneto-optical recording method in practice.

SUMMARY OF THE INVENTION

Accordingly, a first object of the present invention is to provide a magneto-optical recording method capable of performing the overwrite operation, free from the conventional shortcomings, which does not necessitate the initializing step, and shortens the access time, to cope with the high-speed recording of information.

A second object of the present invention is to provide a magneto-optical recording medium used in the above-mentioned magneto-optical recording method.

The first object of the present invention can be achieved by a magneto-optical recording method employing a magneto-optical recording medium which comprises a two-layered type recording layer constructed in such a manner that two magnetic layers are laminated, which have different coercive forces at a lower operation temperature out of the recording and erasing operation temperatures. In this magneto-optical recording method, the power of a laser beam applied to the recording medium in the recording operation differs from that in the erasing operation, with a bias magnetic field applied to the recording medium in the same direction when information is recorded therein and erased therefrom. The intensity of the above-mentioned magnetic field is made greater than the coercive forces of the aforementioned two magnetic layers of the recording medium at the lower operation temperature.

The second object of the present invention can be achieved by a magneto-optical recording medium used in the above-mentioned magneto-optical recording method, which recording medium comprises a two-layered type recording layer constructed in such a manner that a first magnetic layer is laminated on a second magnetic layer. These two perpendicularly anisotropic magnetic layers, which are made of an amorphous alloy of at least one rare earth metal and at least one transition metal, have different coercive forces at a lower operation temperature in the recording and erasing temperatures. Furthermore, at the lower operation temperature, the coercive force of the second magnetic layer is designed to be greater than that of the first magnetic layer, and smaller than the intensity of a bias magnetic field applied to the recording medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic cross-sectional view of a recording layer of a magneto-optical recording medium (type-A) according to the present invention;

FIG. 2 is a schematic cross-sectional view of a recording layer of a magneto-optical recording medium (type-B) according to the present invention;

FIG. 3 is a schematic cross-sectional view of a recording layer of a magneto-optical recording medium (type-C) according to the present invention;

FIG. 16 is a graph showing the relationship among the refractive index of an undercoat layer in a magneto-optical recording medium according to the present invention, the absorbance (A), and the reflectance (R);

FIG. 17 is a cross-sectional view of another example of the magneto-optical recording medium according to the present invention;

FIGS. 18(a) through 18(f) are cross-sectional views of the recording layer of the magneto-optical recording medium which explain the conventional recording and erasing method capable of performing an overwrite operation by changing the power of a single laser beam.

DESCRIPTION OF THE PREFERRED EMBODIMENTS

Figure 4:
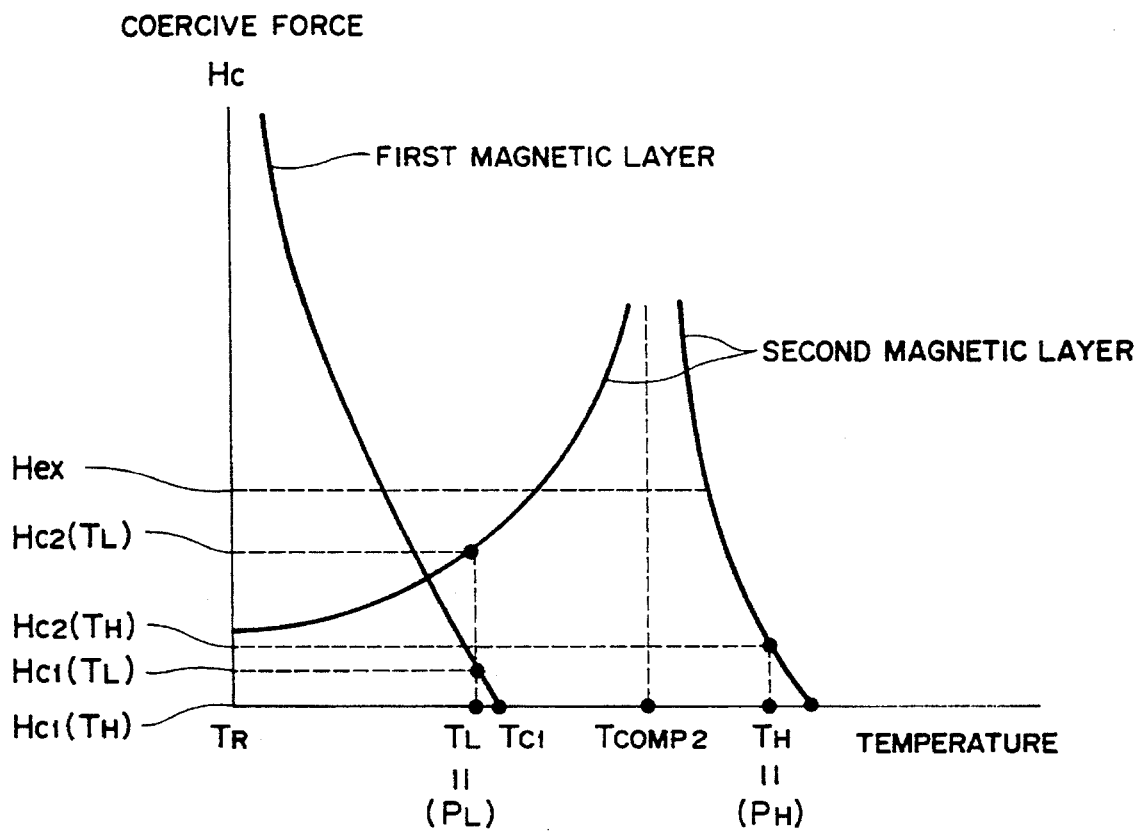
FIG. 4 is a graph showing the relationship between the coercive force (Hc) of two magnetic recording layers of the magneto-optical recording medium (type-A) and the temperature.

In FIG. 1, a two-layered type recording layer of a magneto-optical recording medium (type-A) according to the present invention is illustrated. In this recording layer, a first magnetic layer 1 is formed on a second magnetic layer 2. As can be seen from the graph shown in FIG. 4, the temperature-dependent properties of the coercive force (Hc) of the first and second magnetic layers 1 and 2 are different.

Amorphous magnetic materials are preferably used for the first and second magnetic layers 1 and 2 of the magneto-optical recording medium (type-A). Each magnetic layer is an amorphous alloy thin layer, that is, a vertically magnetized layer, which is made of at least one rare earth metal such as Gd, Dy, Tb, Ho and Er, and at least one transition metal such as Fe and Co.

At room temperature, with respect to the magnetic moment of the first magnetic layer 1, the magnetic moment of the transition metal (referred to as "TM" in figures) contained therein is predominant over that of the rare earth metal. It is preferable that the coercive force (Hc) of the first magnetic layer 1 be 1 kOe or more, which is greater than that of the second magnetic layer 2 at room temperature. At a lower operation temperature, it is preferable that the coercive force (Hc) of the first magnetic layer 1 be 0.5 kOe or less.

On the other hand, with respect to the magnetic moment of the second magnetic layer 2, the magnetic moment of the rare earth (referred to as "RE" in figures) contained therein is predominant over that of the transition metal at room temperature. At a lower operation temperature, it is preferable that the coercive force (Hc) of the second magnetic layer 2 be 2 kOe or less, more preferably 1 kOe or less. This is because the intensity of a bias magnetic field (Hex) applied to the recording medium is designed to be greater than the coercive force (Hc) of the second magnetic layer 2 at a lower operation temperature. It is preferable that the intensity of the bias magnetic field for use in the present invention range from 0.5 kOe to 1.5 kOe.

It is preferable that the compensation temperature of the first magnetic layer 1 (Tcomp1) be below room temperature ($T_r$) from the viewpoint of the coercive force (Hc) thereof at room temperature. It is preferable that the compensation temperature of the second magnetic layer 2 (Tcomp2) be in the range of 70° C. to 180° C.

When the compensation temperature of the first magnetic layer (Tcomp1) is higher than room temperature (Tr), the coercive force (Hc) of the first magnetic layer is too low to be used in practice; and when the compensation temperature of the second magnetic layer 2 (Tcomp2) is lower than 70° C., that is, when the compensation temperature is close to the lower operation temperature, the coercive force (Hc) of the second magnetic layer becomes greater at the lower operation temperature, which makes it difficult to reverse the direction of magnetization in the second magnetic layer 2. In contrast to this, when the compensation temperature of the second magnetic layer 2 (Tcomp2) is higher than 180° C., a higher operation temperature will have to be chosen, which requires a laser beam having a great power.

It is preferable that the Curie temperatures of the first and second magnetic layers 1 and 2 (Tc1 and Tc2) satisfy the following relation:

$$Tc1 < Tcomp2 < Tc2$$

It is supposed that an operation temperature ($T_H$) corresponds to the power of the laser beam applied to the recording medium when the recording (or erasing) operation is performed, and an operation temperature ($T_L$) corresponds to the power of the laser beam when the erasing (or recording) operation is performed, in which $T_H$ is higher than $T_L$. In this case, it is preferable to use a second magnetic layer 2 having a compensation temperature (Tcomp2) which is between the higher operation temperature ($T_H$) and the lower operation temperature ($T_L$). Furthermore, it is preferable that the Curie temperature of the first magnetic layer 1 (Tc1) be lower than the compensation temperature of the second magnetic layer 2 (Tcomp2) and be close to the lower operation temperature ($T_L$). It is preferable that the compensation temperature of the second magnetic layer 2 (Tcomp2) be higher than the lower operation temperature ($T_L$) by 30° C. or more, and lower than the higher operation temperature ($T_H$) by 30° C. or more.

Furthermore, there is the following relationship among the coercive force of the first magnetic layer 1 at a lower operation temperature [Hc1($T_L$)], the coercive force of the second magnetic layer 2 at a lower operation temperature [Hc2 ($T_L$)], the intensity of the bias magnetic field (Hex), the intensity of a flotation magnetic field (Hf), and the exchanged energy ($\delta w$) between the first magnetic layer 1 and the second magnetic layer 2 when a laser beam for elevating the temperature to the lower operation temperature is applied to the recording medium:

$$Hc2(T_L) > Hc1(T_L)$$

$$|Hex| > |Hc2(T_L) + Hf + \sigma w|$$

The term "flotation magnetic field" means a magnetic field formed by a leakage flux from an area magnetized in a predetermined direction on the surface of a magneto-optical recording medium.

Preferable examples of the amorphous magnetic alloys used in the first magnetic layer 1 of the magneto-optical recording medium (type-A) according to the present invention are those having the following formulas:

$$Tb_xFe_{100-x-y}Co_y \quad (1)$$

where $y \leq 4$ atom %.

$$(Tb_nDy_{1-n})_xFe_{100-x-y}Co_y \quad (2)$$

where $0 < n < 0.5$ and $0 \leq y \leq 9$ atom % or $0.5 < n \leq 1.0$ and $0 \leq y \leq 15$ atom %.

$$(Gd_nDY_{1-n})_xFe_{100-x-y}Co_y \quad (3)$$

where $0 < n < 0.5$ and $0 \leq y \leq 15$ atom %.

$$(Tb_nEr_{1-n})_xFe_{100-x-y}Co_y \quad (4)$$

where $0.5 < n < 1.0$ and $0 \leq y \leq 20$ atom %.

$$(Tb_nHo_{1-n})_xFe_{100-x-y}Co_y \quad (5)$$

where $0.5 < n < 1.0$ and $0 \leq y \leq 15$ atom %.

In the above formulas, the value of x (atom %) is chosen so as to make up an alloy composition in which the magnetic moment of the employed transition metals is predominant over that of the rare earth metals at room temperature.

Examples of the amorphous magnetic alloys used in the second magnetic layer 2 of the magneto-optical recording medium (type-A) according to the present invention are those having the following formulas:

$$(Gd_nDy_{1-n})_xFe_{100-x-y}Co_y \quad (1)$$

where $0.4 < n < 1.0$ and $0 \leq y \leq 12$ atom %.

$$(Tb_nDy_{1-n})_xFe_{100-x-y}Co_y \quad (2)$$

where $0 < n \leq 0.4$ and $10 \leq y \leq 30$ atom %.

$$(Gd_nHo_{1-n})_xFe_{100-x-y}Co_y \quad (3)$$

where $0 < n \leq 0.5$ and $5 \leq y \leq 30$ atom %.

$$(Tb_nHo_{1-n})_xFe_{100-x-y}Co_y \quad (4)$$

where $0 < n \leq 0.6$ and $10 \leq y \leq 30$ atom %.

$$(Gd_nTb_{1-n})_xFe_{100-x-y}Co_y \quad (5)$$

where $0.3 < n \leq 1.0$ and $0 < y \leq 20$ atom %.

In the above formulas, the value of x (atom %) is chosen so as to make up an alloy composition in which the magnetic moment of the employed rare earth metals is predominant over that of the transition metals at room temperature.

The present invention will now be explained in detail by referring to the magneto-optical recording medium (type-B) according to the present invention as shown in FIG. 2.

Figure 5:
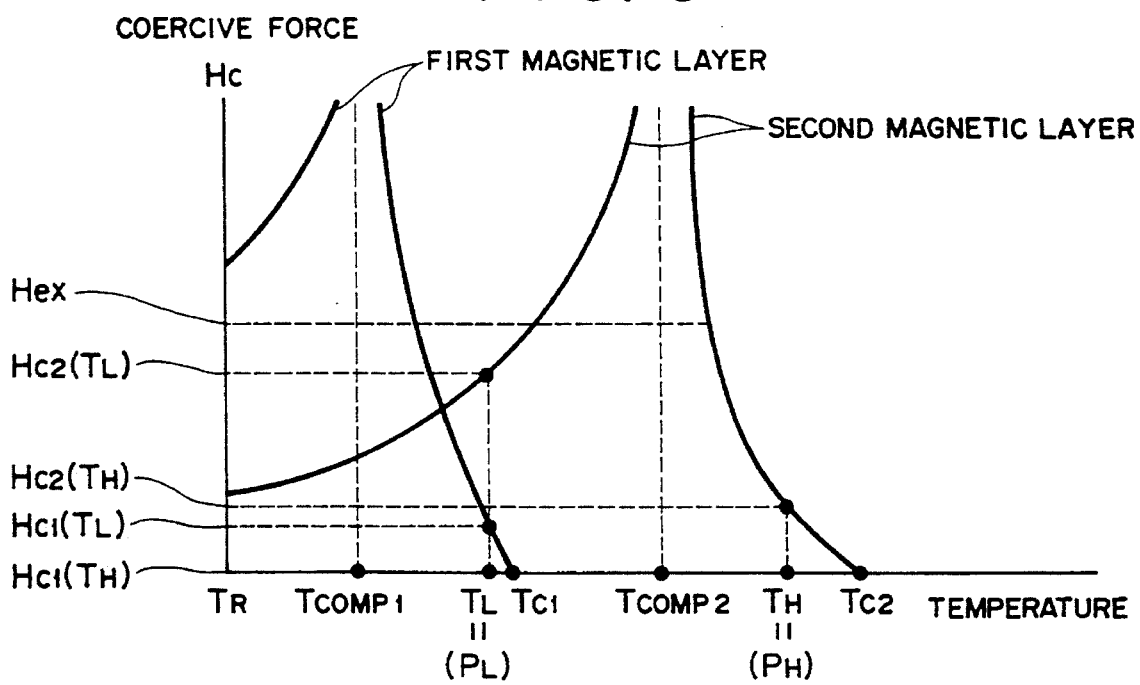
FIG. 5 is a graph showing the relationship between the coercive force (Hc) of two magnetic recording layers of the magneto-optical recording medium (type-B) and the temperature.

As apparent from the cross-sectional view shown in FIG. 2, this recording layer is also constructed in such a manner that a first magnetic layer 3 is overlaid on a second magnetic layer 4. The temperature-dependent properties of the coercive force of the first magnetic layer 3 are different from those of the second magnetic layer 4, as shown in FIG. 5. Just like the first and second magnetic layers 1 and 2 in the magneto-optical recording medium (type-A), each of the first and second magnetic layers 3 and in this recording medium (type-B) is an amorphous alloy thin layer, which is vertically magnetized, made of at least one rare earth metal such as Gd, Dy, Tb, Ho and Er and at least one transition metal such as Fe and Co.

In the magneto-optical recording medium (type-B), however, unlike the magneto-optical recording medium (type-A), the magnetic moment of the rare earth metals is predominant over that of the transition metals in both the first magnetic layer 3 and the second magnetic layer 4.

The temperature-dependent properties of the coercive force (Hc) of each magnetic layer are shown in FIG. 5.

It is preferable that the coercive force [Hc1($T_R$)] of the first magnetic layer 3 at room temperature ($T_R$) be 2 kOe or more, which is greater than that of the second magnetic layer 4 [Hc2($T_R$)]. In addition to this, it is preferable that the coercive force [Hc1($T_L$)] of the first magnetic layer 3 at a lower operation temperature ($T_L$) be 0.5 kOe or less. The coercive force [Hc2($T_L$)] of the second magnetic layer 4 at a lower operation temperature, which is set to be greater than the coercive force [Hc1($T_R$)] of the first magnetic layer 3 at room temperature, is preferably 2 kOe or less, and more preferably 1 kOe or less. This is because the intensity of a bias magnetic field (Hex) applied to the recording medium is set so as to be greater than the above coercive force [Hc2($T_L$)] of the second magnetic layer 4.

The materials for the first magnetic layer 3 and the second magnetic layer 4 are selected from those which can satisfy the following relationship:

$$Tcomp1 < Tc1 < Tcomp2 < Tc2$$

More specifically, it is preferable that the compensation temperature of the materials for the first magnetic layer 3 (Tcomp1) be lower than the Curie temperature thereof (Tc1) by 30° C. or more, and the compensation temperature of the materials for the second magnetic layer 4 (Tcomp2) be higher than the Curie temperature of those for the first magnetic layer 3 (Tc1) by 30° C. or more and lower than the Curie temperature of those for the second magnetic layer 4 (Tc2) by 30° C. or more.

In the second magnetic layer 4, amorphous magnetic alloys whose compensation temperature is between the higher operation temperature ($T_H$) and the lower operation temperature ($T_L$) can be employed. On the other hand, in the first magnetic layer 3, amorphous magnetic alloys whose Curie temperature is in the vicinity of the lower operation temperature ($T_L$) can be employed.

Furthermore, there is the following relationship among the coercive force of the first magnetic layer 3 at a lower operation temperature [$Hc1(T_L)$], the coercive force of the second magnetic layer 4 at a lower operation temperature [$Hc2(T_L)$], the intensity of a bias magnetic field (Hex), the intensity of a flotation magnetic field (Hf), and the exchanged energy ($\sigma w$) between the first magnetic layer 3 and the second magnetic layer 4 when the laser beam for elevating the temperature to the lower operation temperature is applied to the recording medium:

$$Hc2(T_L) > Hc1(T_L)$$

$$|Hex| > |Hc2(T_L) + Hf + \sigma w|$$

Preferable examples of the amorphous magnetic alloys used in the first magnetic layer 3 of the magneto-optical recording medium (type-B) according to the present invention are those having the following formulas:

$$Tb_x Fe_{100-x-y} Co_y \quad (1)$$

where $0 < y < 4$ atom %.

$$(Tb_n Dy_{1-n})_x Fe_{100-x-y} Co_y \quad (2)$$

where $0 \leq n \leq 0.5$ and $0 \leq y \leq 30$ atom % or $0.5 < n < 1.0$ and $0 \leq y \leq 20$ atom %.

$$(Tb_n Ho_{1-n})_x Fe_{100-x-y} Co_y \quad (3)$$

where $0.3 < n < 1.0$ and $0 \leq y \leq 20$ atom %.

$$(Tb_n Er_{1-n})_x Fe_{100-x-y} Co_y \quad (4)$$

where $0.5 < n < 1.0$ and $0 \leq y \leq 20$ atom %.

$$(Gd_n Dy_{1-n})_x Fe_{100-x-y} Co_y \quad (5)$$

where $0 < n < 0.5$ and $0 \leq y \leq 10$ atom %.

In the above formulas, the value of x (atom %) is chosen so as to make up an alloy composition in which the magnetic moment of the employed rare earth metals is predominant over that of the transition metals at room temperature.

Examples of the amorphous magnetic alloys used in the second magnetic layer 4 of the magneto-optical recording medium (type-B) according to the present invention are those having the following formulas:

$$Tb_x Fe_{100-x-y} Co_y \quad (1)$$

where $4 < y < 20$ atom %.

$$(Tb_n Dy_{1-n})_x Fe_{100-x-y} Co_y \quad (2)$$

where $0 \leq n \leq 0.5$ and $5 \leq y \leq 30$ atom % or $0.5 < n < 1.0$ and $3 \leq y \leq 20$ atom %.

$$(Gd_n Dy_{1-n})_x Fe_{100-x-y} Co_y \quad (3)$$

where $0 \leq n \leq 0.5$ and $5 \leq y \leq 25$ atom % or $0.5 < n < 1.0$ and $3 \leq y \leq 15$ atom %.

$$(Gd_n Tb_{1-n})_x Fe_{100-x-y} Co_y \quad (4)$$

where $0 \leq n \leq 0.5$ and $7 \leq y < 20$ atom % or $0.5 < n < 1.0$ and $3 \leq y \leq 15$ atom %.

$$(Tb_n Er_{1-n})_x Fe_{100-x-y} Co_y \quad (5)$$

where $0.5 < n < 1.0$ and $5 < y < 30$ atom %.

$$(Tb_n Ho_{1-n})_x Fe_{100-x-y} Co_y \quad (6)$$

where $0.5 < n < 1.0$ and $5 < y < 30$ atom %.

In the above formulas, the value of x (atom %) is chosen so as to make up an alloy composition in which the magnetic moment of the employed rare earth metals is predominant over that of the transition metals at room temperature.

The present invention will now be explained in detail by referring to the magneto-optical recording medium (type-C) according to the present invention as shown in FIG. 3.

Figure 6:
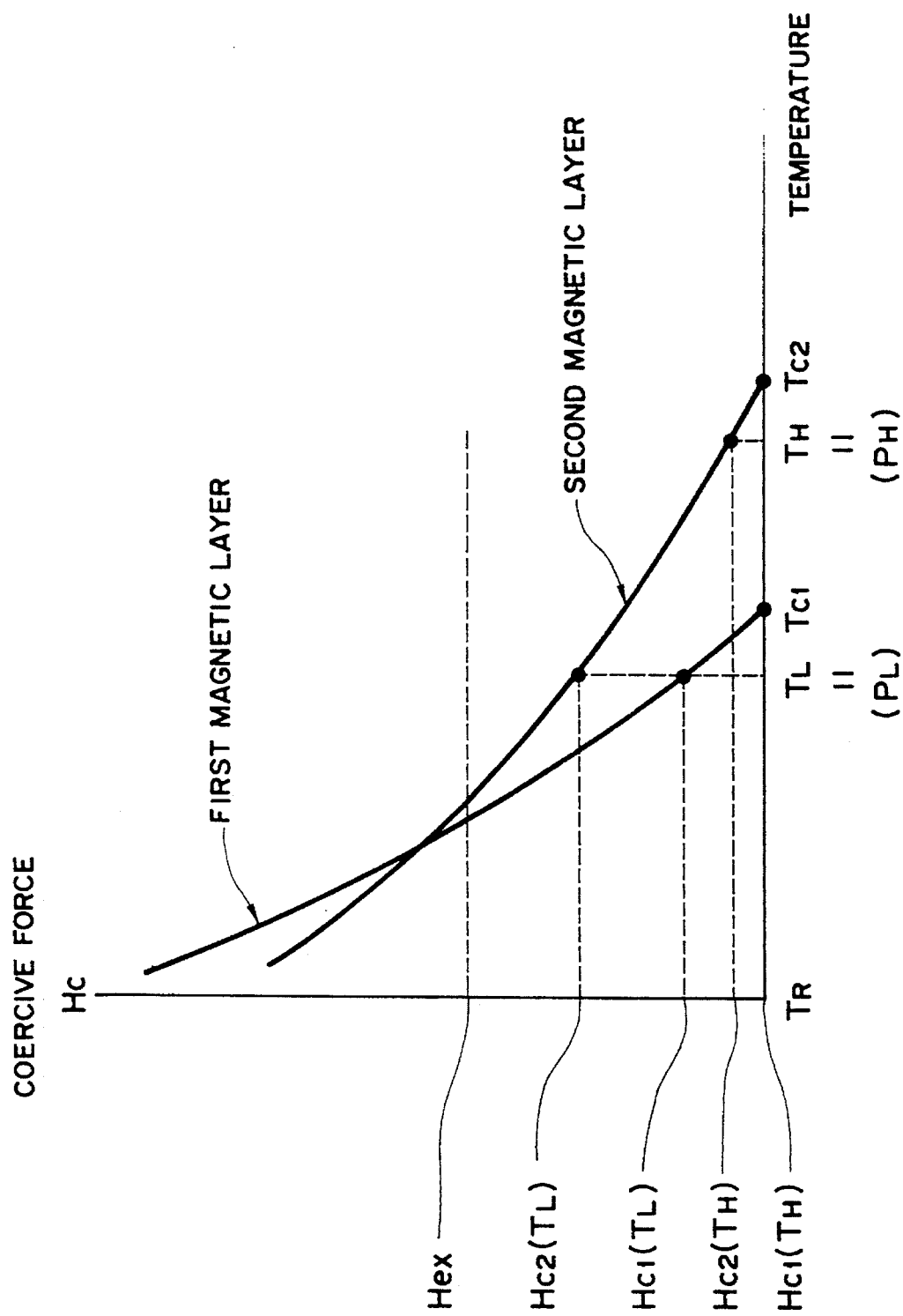
FIG. 6 is a graph showing the relationship between the coercive force (Hc) of two magnetic recording layers of the magneto-optical recording medium (type-C) and the temperature.

As apparent from the cross-sectional view shown in FIG. 3, this recording layer is also constructed in such a manner that a first magnetic layer 5 is overlaid on a second magnetic layer 6. The temperature-dependent properties of the coercive force of the first magnetic layer 5 are different from those of the second magnetic layer 6, as shown in FIG. 6. Just like the first and second magnetic layers 1 and 2 in the magneto-optical recording medium (type-A) and the first and second magnetic layers 3 and 4 in the magneto-optical recording medium (type-B), each of the first and second magnetic layers 5 and 6 in this recording medium (type-C) is an amorphous alloy thin layer, which is vertically magnetized, made of at least one rare earth metal such as Gd, Dy, Tb, Ho and Er and at least one transition metal such as Fe and Co.

In the magneto-optical recording medium (type-C), however, unlike the magneto-optical recording media (type-A) and (type-B), the magnetic moment of the transition metals is predominant over that of the rare earth metals at room temperature in both the first magnetic layer 5 and the second magnetic layer 6.

The temperature-dependent properties of the coercive force (Hc) of each magnetic layer are shown in FIG. 6.

There is also the following relationship among the coercive force of the first magnetic layer 5 at a lower operation temperature [$Hc1(T_L)$], the coercive force of the second magnetic layer 6 at a lower operation temperature $Hc2(T_L)$], the intensity of a bias magnetic field (Hex), the intensity of a flotation magnetic field (Hf), and the exchanged energy ($\sigma w$) between the first magnetic layer 5 and the second magnetic layer 6 when the laser beam for elevating the temperature to the lower operation temperature is applied to the recording medium:

$$Hc2(T_L) > Hc1(T_L)$$

$$|Hex| > |Hc2(T_L) + Hf + \sigma w|$$

It is preferable that the coercive force [$Hc1(T_L)$] of the first magnetic layer 5 at a lower operation temperature ($T_L$) be 0.5 kOe or less. In addition to this, it is preferable that the coercive force [$Hc2(T_L)$] of the second magnetic layer 6 at a lower operation temperature be 2 kOe or less, more preferably 1 kOe or less.

The materials for the first magnetic layer 5 and the second magnetic layer 6 are selected from those which can satisfy the following relationship:

$$T_L < Tc1 < T_H < Tc2$$

More specifically, it is preferable that the Curie temperature of the first magnetic layer 5 (Tc1) and that of the second magnetic layer 6 (Tc2) be respectively 160° C. or more, and 180° C. or more. Furthermore, it is preferable that the compensation temperature of the first magnetic layer 5 (Tcomp1) be in the range of 40° C. to 100° C., and the compensation temperature of the second magnetic layer 6 (Tcomp2) be in the range of 70° C. to 180° C.

Preferable examples of the amorphous magnetic alloys used in the first magnetic layer 5 of the magneto-optical recording medium (type-C) according to the present invention are those having the following formulas:

$$Tb_xFe_{100-x} \quad (1)$$

$$Dy_xFe_{100-x-y}Co_y \quad (2)$$

where $10 \leq y \leq 20$ atom %.

$$(Tb_nDy_{1-n})_xFe_{100-x-y}Co_y \quad (3)$$

where $0 < n < 0.5$ and $0 \leq y \leq 10$ atom %.

$$(Gd_nDY_{1-n})_xFe_{100-x-y}Co_y \quad (4)$$

where $0 \leq n < 0.5$ and $0 \leq y \leq 10$ atom %.

$$(Tb_nHo_{1-n})_xFe_{100-x-y}Co_y \quad (5)$$

where $0.5 < n < 1.0$ and $0 \leq y \leq 15$ atom %.

$$(Tb_nEr_{1-n})_xFe_{100-x-y}Co_y \quad (6)$$

where $0.5 < n < 1.0$ and $0 \leq y \leq 15$ atom %.

In the above formulas, the value of x (atom %) is chosen so as to make up an alloy composition in which the magnetic moment of the transition metals is predominant over that of the transition metals at room temperature.

Examples of the amorphous magnetic alloys used in the second magnetic layer 6 of the magneto-optical recording medium (type-C) according to the present invention are those having the following formulas:

$$Tb_xFe_{100-x}Co_y \quad (1)$$

where $7 \leq y \leq 25$ atom %.

$$Dy_xFe_{100-x}Co_y \quad (2)$$

where $12 \leq y \leq 35$ atom %.

$$Gd_xFe_{100-x-y}Co_y \quad (3)$$

where $0 \leq y \leq 10$ atom %.

$$(Gd_nDy_{1-n})_xFe_{100-x-y}Co_y \quad (4)$$

where $0.5 \leq n < 1.0$ and $0 \leq y \leq 15$ atom %.

$$(Gd_nTb_{1-n})_xFe_{100-x-y}Co_y \quad (5)$$

where $0.5 \leq n < 1.0$ and $0 \leq y \leq 15$ atom %.

$$(Tb_nDy_{1-n})_xFe_{100-x-y}Co_y \quad (6)$$

where $0 < n < 1.0$ and $10 \leq y \leq 30$ atom %.

In the above formulas, the value of x (atom %) is chosen so as to make up an alloy composition in which the magnetic moment of the transition metals is predominant over that of the rare earth metals at room temperature.

Referring to FIGS. 7(a) through 7(e), the process of recording information in the magneto-optical recording medium (type-A) according to the present invention and erasing the same therefrom will now be explained in detail.

Figure 7A:
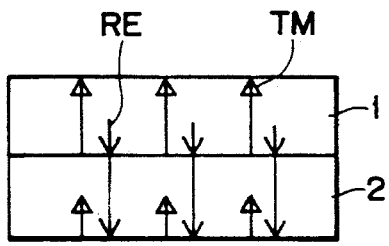
FIGS. 7(a) through 7(e) and FIGS. 8(a) through 8(e) are cross-sectional views of the recording layer of the magneto-optical recording medium (type-A) according to the present invention which explain the process of recording information and erasing the same.

At room temperature a first magnetic layer 1 and a second magnetic layer 2 are magnetized in such a fashion as shown in FIG. 7(a).

Figure 7B:
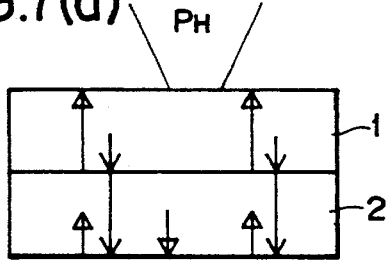

When a laser beam having a power of ($P_W$), identified as ($P_H$) in FIG. 7(b), corresponding to an operation temperature of ($T_H$), is applied to the recording medium for recording information, the magnetization in the first magnetic layer 1 is almost extinguished, and that in the second magnetic layer 2 becomes faint as shown in FIG. 7(b). The reason for this is that at a higher operation temperature the coercive force of the first magnetic layer 1 [$Hc1(T_H)$] is smaller than that of the second magnetic layer 2 [$Hc2(T_H)$]. In this case, the power of a laser beam for recording information ($P_W$) is greater than that for erasing information. In such a state, a bias magnetic field (Hex) is applied to the recording medium in a downward direction, that is, in the same direction as the magnetized direction of the second magnetic layer 2 in the state where information is erased, as shown in FIG. 7(b). As a result, the magnetized direction in the area exposed to the laser in the second magnetic layer 2 is reversed by means of the bias magnetic field (Hex).

As the temperature of the recording medium is lowered, the magnetization of the first magnetic layer 1 is reversed by the exchange coupling force between the first and second magnetic layers 1 and 2. When the recording medium is cooled to room temperature, the magnetized direction in the first magnetic layer 1 is stabilized as shown in FIG. 7(c) and information is recorded therein.

Figure 7C:
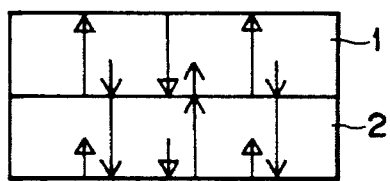
Figure 7D:
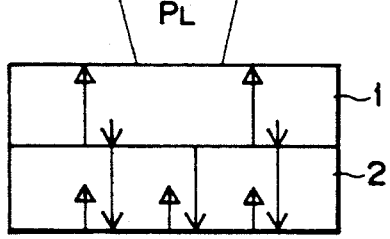

The information recorded in the recording layer of the magneto-optical recording medium (type-A) according to the present invention is erased as follows:

The information is recorded in the recording layer as shown in FIG. 7(c). When a laser beam having a power of ($P_E$), identified as ($P_L$) in FIG. 7(d), corresponding to an operation temperature of ($T_L$), is applied to the recording medium for erasing the information, as shown in FIG. 7(d), the exchange coupling force between the first magnetic layer 1 and the second magnetic layer 2 is remarkably decreased. In such a state, when a bias magnetic field (Hex), which is greater than the coercive force of the second magnetic layer 2 at a lower operation temperature [$Hc2(T_L)$] is applied to the recording medium in a downward direction, that is, in the same direction as the magnetized direction of the second magnetic layer 2 in the state where information is erased, the magnetized direction in the area exposed to the laser beam in the second magnetic layer 2 is reversed in the direction of the bias magnetic field (Hex). This is because there is the following relationship among the intensity of the bias magnetic field, the coercive force of the second magnetic layer 2 at a lower operation temperature [$Hc2(T_L)$] and the coercive force of the first magnetic layer 1 at a lower operation temperature [$Hc1(T_L)$]:

$$Hc2(T_L) > Hc1(T_L)$$

Figure 7E:
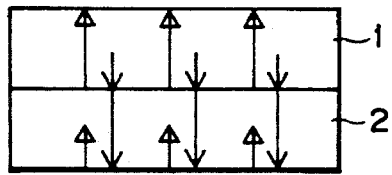

As the temperature of the recording medium is lowered, the magnetization of the first magnetic layer 1 is reversed by the exchange coupling force between the first and second magnetic layers 1 and 2. When the recording medium is cooled to room temperature, the magnetized direction of the first magnetic layer 1 is stabilized as shown in FIG. 7(e), which is the same as in FIG. 7(a), thus the information is erased therefrom.

In the above described recording and erasing operation, the laser power for writing, $P_W$, is greater than the laser power for erasing, $P_E$.

In the case where the power of the employed laser beam for erasing the information ($P_E$) is greater than that for recording the same ($P_W$), a bias magnetic field (Hex) is applied to the magneto-optical recording medium (type-A) in an opposite direction to the magnetized direction of the second magnetic layer 2 in the state where the information is erased, which enables the information to be recorded in this recording medium and erased therefrom likewise.

Such a process of recording and erasing information is described in detail by referring to FIGS. 8(a) through 8(e).

Figure 8A:
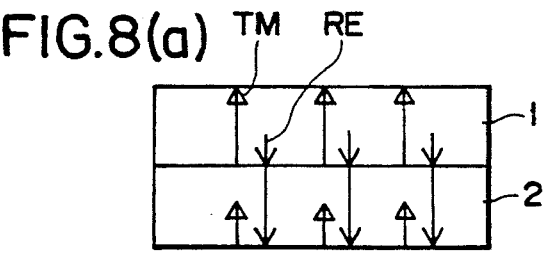

The first and second magnetic layers 1 and 2 of the magneto-optical recording medium (type-A) are magnetized at room temperature in such a fashion as shown in FIG. 8(a).

Figure 8B:
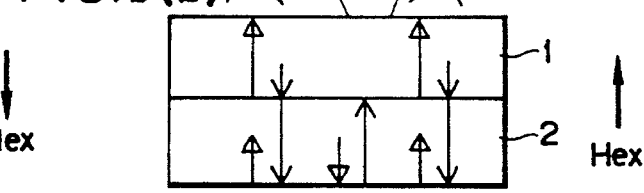

When a laser beam having a power of $(P_W)$, identified as $(P_L)$ in FIG. 8(b), corresponding to an operation temperature of $(T_L)$, is applied to the recording medium for recording information, the exchange coupling force between the first magnetic layer 1 and the second magnetic layer 2 is extremely decreased. In such a state, when a bias magnetic field (Hex), which is greater than the coercive force of the second magnetic layer 2 at a lower operation temperature $[Hc2(T_L)]$, is applied to the recording medium in an upward direction, that is, in the opposite direction to the magnetized direction of the second magnetic layer 2 in the state where information is erased, the magnetized direction in the area exposed to the laser beam in the second magnetic layer 2 is reversed in the same direction as the bias magnetic field (Hex), as shown in FIG. 8(b). This is because there is the following relationship among the (Hex), $[Hc2(T_L)]$ and $[Hc1(T_L)]$, as apparent from the graph shown in FIG. 4:

$$Hex > Hc2(T_L) > Hc1(T_L)$$

As the temperature of the recording medium is lowered, the magnetization of the first magnetic layer 1 is reversed by the exchange coupling force between the first and the second magnetic layers 1 and 2, in such a fashion as to correspond to the magnetization of the second magnetic layer 2. When the recording medium is cooled to room temperature, the magnetized direction of the first magnetic layer 1 is stabilized as shown in FIG. 8(c), so that information is recorded therein.

Figure 8C:
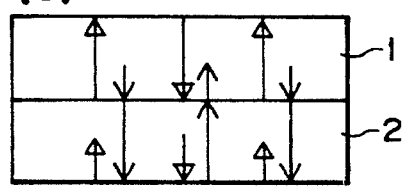
Figure 8D:
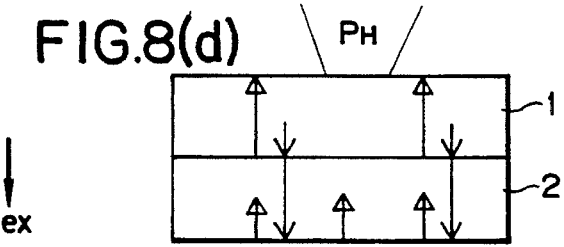

The information recorded in the recording layer of the magneto-optical recording medium (type-A) according to the present invention is erased as follows:

The information is recorded in the recording medium as shown in FIG. 8(c). When a laser beam having a power of $(P_E)$, identified as $(P_H)$ in FIG. 8(d), corresponding to an operation temperature of $(T_H)$, is applied to the recording medium for erasing the information, as shown in FIG. 8(d), the magnetization of the first magnetic layer 1 is almost extinguished, and that in the second magnetic layer 2 becomes faint as shown in FIG. 8(d). The reason for this is that at a higher operation temperature the coercive force of the first magnetic layer 1 $[Hc1(T_H)]$ is smaller than that of the second magnetic layer 2 $[Hc2(T_H)]$ as apparent from the graph as shown in FIG. 4. In such a state, when a bias magnetic field (Hex) is applied to the recording medium in an upward direction, that is, in the opposite direction to the magnetized direction of the second magnetic layer 2 in the state where information is erased, the magnetization in the area exposed to the laser beam in the second magnetic layer 2 is reversed by the bias magnetic field (Hex).

Figure 8E:
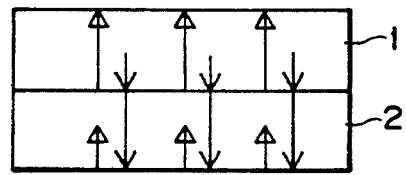

As the temperature of the recording medium is lowered, the magnetization of the first magnetic layer 1 is reversed by the exchange coupling force between the first and second magnetic layers 1 and 2. When the recording medium is cooled to room temperature, the first magnetic layer 1 is stabilized as shown in FIG. 8(e), which is the same as in FIG. 8(a), thus, the information is erased therefrom.

A continuous recording and erasing process will now be explained, by referring to FIGS. 9(a) and 9(b).

Figure 9A:
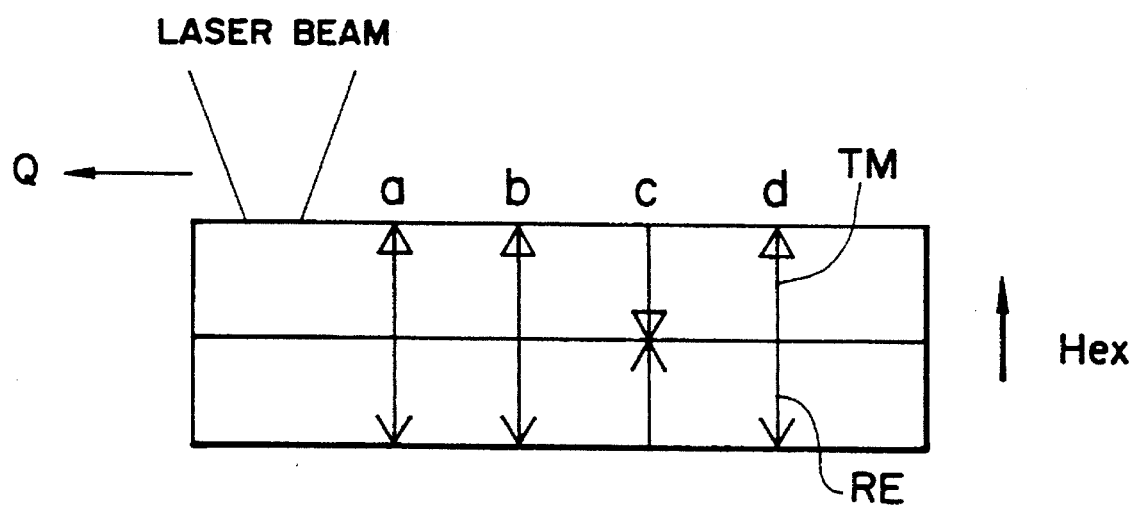
FIGS. 9(a) and 9(b) are cross-sectional views of the recording layer of the magneto-optical recording medium (type-A) according to the present invention which explain the process of a continuous recording and erasing operation.
Figure 9B:
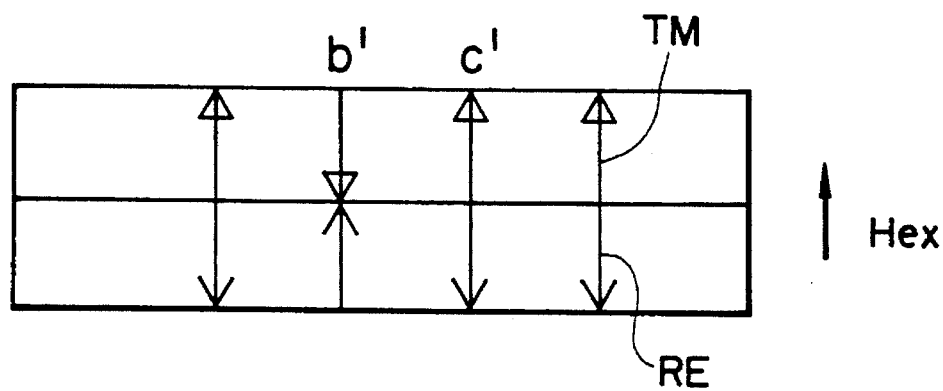

In FIGS. 9(a) and 9(b), it is supposed that the magneto-optical recording medium (type-A) advances in the direction of an arrow Q, with a magnet placed below the recording medium to provide a bias magnetic field (Hex), and that a single laser beam is applied to the recording medium from above the recording medium.

In the state as shown in FIG. 9(a), a bit b in an erased state and a bit c in a recorded state are respectively converted into a bit b' in a recorded state and a bit c' in an erased state.

In FIGS. 9(a) and 9(b), it is supposed that the power of the single laser beam for recording information $(P_W)$ be greater than that for erasing the same $(P_E)$. As the magneto-optical recording medium (type-A) moves in the direction of the arrow Q, the power of a single laser beam applied to the recording medium is switched in such a mode as $P_E$ to the bit a, $P_W$ to the bit b, $P_E$ to the bit c and $P_E$ to the bit d. As a result, the bit b in an erased state is changed to the bit b' in a recorded state, and the bit c in a recorded state to the bit c' in an erased state. This process is capable of performing an overwrite operation by simply controlling the power of the single laser beam, without the necessity for changing the direction of the bias magnetic field applied to the recording medium depending on the operations of recording and erasing information.

In the case where the power of the single laser beam for recording information $(P_W)$ is smaller than that for erasing the same $(P_E)$, the overwriting operation can also be performed by applying the bias magnetic field to the recording medium in a downward direction, without changing the direction depending on the recording and erasing operations.

Referring to FIGS. 10(a) through 10(e), the process of recording information in the magneto-optical recording medium (type-B) according to the present invention and erasing the same therefrom will now be explained in detail.

Figure 10A:
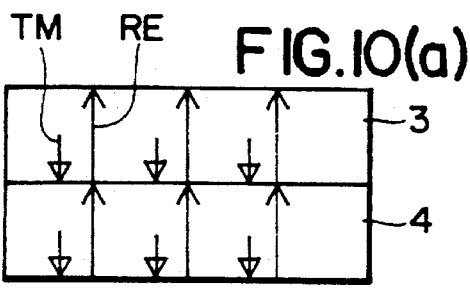
FIGS. 10(a) through 10(e) and FIGS. 11(a) through 11(e) are cross-sectional views of the recording layer of the magneto-optical recording medium (type-B) according to the present invention which explain the process of recording information and erasing the same.
Figure 11A:
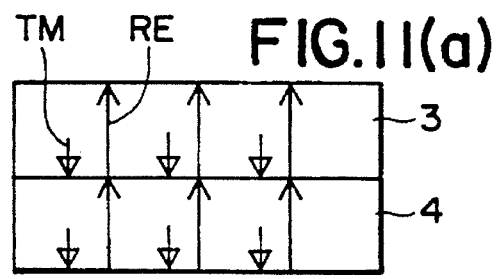

At room temperature the first magnetic layer 3 and the second magnetic layer 4 are magnetized in such a fashion as shown in FIG. 10(a).

Figure 10B:
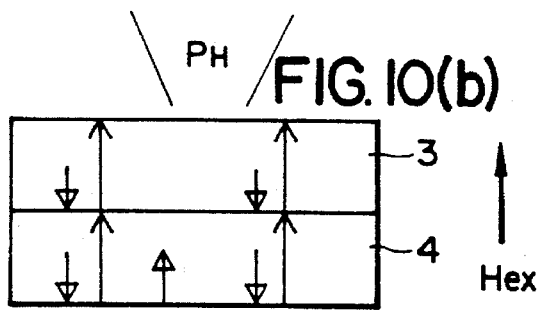
Figure 11B:
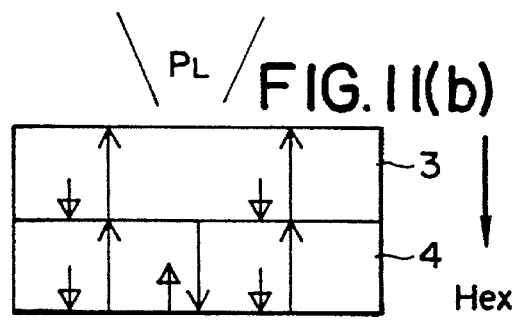

When a laser beam having a power of $(P_W)$, identified as $(P_H)$ in FIG. 10(b), corresponding to an operation temperature of $(T_H)$, is applied to the recording medium for recording information, the magnetization of the first magnetic layer 3 is almost extinguished, and that of the second magnetic layer 4 becomes faint as illustrated in FIG. 10(b). The reason for this is that at a higher operation temperature the coercive force of the first magnetic layer 3 $[Hc1(T_H)]$ is smaller than that of the second magnetic layer 2 $[Hc2(T_H)]$. In this case, the power of the laser beam for recording information $(P_W)$ is greater than that for erasing information. In such a state, when a bias magnetic field (Hex) is applied to the recording medium in an upward direction, that is, in the same direction as the magnetized direction of the second magnetic layer 4 in the state where information is erased, as shown in FIG. 10(b), the magnetized direction in the area exposed to the laser beam in the second magnetic layer 4 is reversed by the bias magnetic field (Hex).

As the temperature of the recording medium is lowered, the magnetization of the first magnetic layer 3 is reversed by the exchange coupling force between the first and the second magnetic layers 3 and 4. When the recording medium is cooled to room temperature, the first magnetic layer 3 is magnetized and stabilized as shown in FIG. 10(c) and information is thus recorded therein.

Figure 10C:
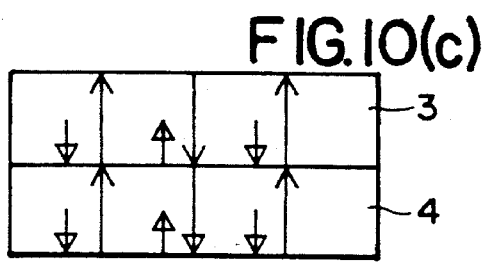
Figure 11C:
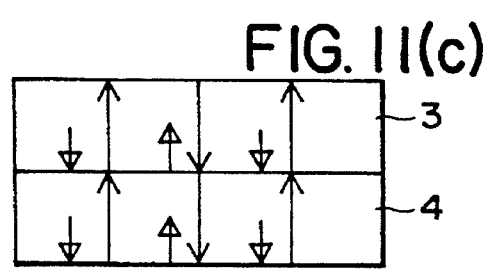
Figure 10D:
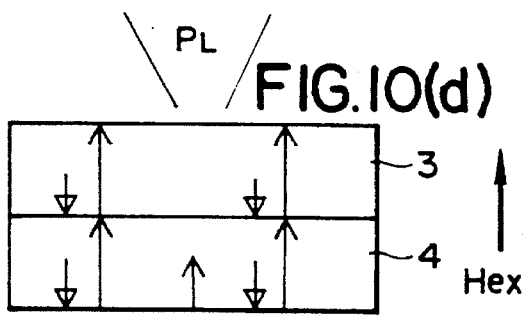
Figure 11D:
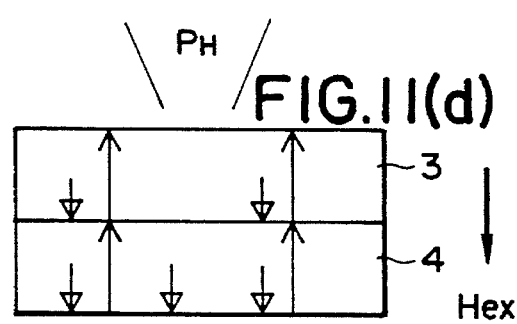

The information recorded in the magneto-optical recording medium (type-B) according to the present invention is erased as follows:

The information is recorded in the recording medium as shown in FIG. 10(c). A laser beam having a power of $(P_E)$, identified as $(P_L)$ in FIG. 10(d), corresponding to an operation temperature of $(T_L)$, is applied to the recording medium for erasing the information, as shown in FIG. 10(d). When a bias magnetic field ( Hex), which is greater than the coercive force of the second magnetic layer 4 at a lower operation temperature [$Hc2(T_L)$], is applied to the recording medium in an upward direction, that is, in the same direction as the magnetized direction of the second magnetic layer 4 in the state where information is erased, the magnetized direction in the area exposed to the laser beam in the second magnetic layer 4 is reversed by the bias magnetic field (Hex). This is because there is the following relationship among the intensity of the bias magnetic field, the coercive force of the second magnetic layer 4 at a lower operation temperature [$Hc2(T_L)$] and the coercive force of the first magnetic layer 3 at a lower operation temperature [$Hc1(T_L)$], as apparent from the graph shown in FIG. 5:

$$Hc2(T_L) > Hc1(T_L)$$

Figure 10E:
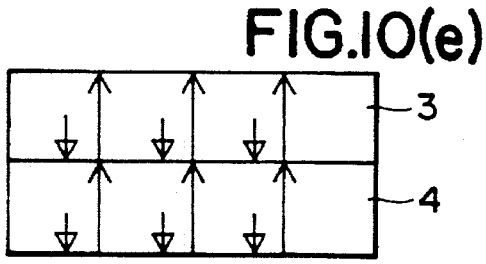
Figure 11E:
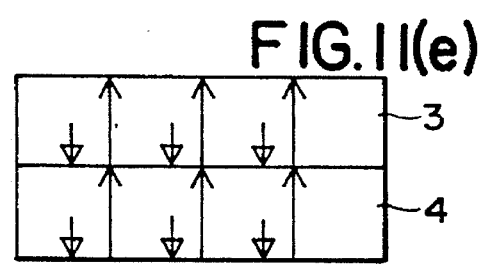

As the temperature of the recording medium is lowered, the magnetization of the first magnetic layer 3 is reversed by the exchange coupling force between the first and the second magnetic layers 3 and 4. When the recording medium is cooled to room temperature, the first magnetic layer 3 is magnetized and stabilized as shown in FIG. 10(e), which is the same as in FIG. 10(a), thus, information is erased therefrom.

In the above recording and erasing operations, the laser power $P_W$ for recording is greater than the laser power $P_E$ for erasing.

In the case where the power of the employed laser beam for erasing the information ($P_E$) is greater than that for recording the same ($P_W$), a bias magnetic field (Hex) is applied to the magneto-optical recording medium (type-B) in an opposite direction to the magnetized direction of the second magnetic layer 4 in the state where information is erased, whereby the information is recorded in this recording medium and erased therefrom likewise, as illustrated in FIGS. 11(a) through 11(e).

In addition to this, a continuous recording and erasing operation can also be carried out in the magneto-optical recording medium (type-B) by the same mechanism as employed in the magneto-optical recording medium (type-A).

with respect to the magneto-optical recording medium (type-C) according to the present invention, when the power of the employed laser beam for recording information in the recording medium is greater than that for erasing it therefrom, the recording and erasing operations can also be carried out as follows: A bias magnetic field (Hex) is applied to the recording medium throughout the recording and erasing operations in the same direction as the magnetized direction of the second magnetic layer 6 in the state where information is erased. When the power of the above laser beam for recording information in the recording medium is smaller than that for erasing it therefrom, the bias magnetic field (Hex) is applied to the recording medium throughout the recording and erasing operations in the opposite direction to the magnetized direction of the second magnetic layer 6 in the state where information is erased, and the intensity of the bias magnetic field (Hex) is set so as to be greater than the coercive force [$Hc2(T_L)$] of the second magnetic layer 6 at a lower operation temperature ($T_L$), whereby the overwrite operation can be performed in the magneto-optical recording medium (type-C) by the same mechanism as employed in the magneto-optical recording media (type-A) and (type-B).

The magneto-optical recording method according to the present invention has been explained with respect to the case where a single laser beam is employed to record and erase information. In addition to this, the present invention is applicable to a two-beam system which uses a pair of laser beams, that is, a preceding beam and a succeeding beam.

The specific configuration of the magneto-optical recording medium according to the present invention will now be explained in detail by referring to FIG. 12.

Figure 12:
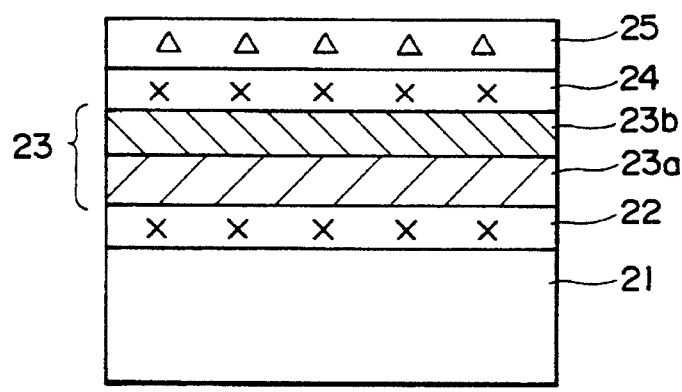
FIG. 12 is a cross-sectional view of an example of the magneto-optical recording medium according to the present invention.

FIG. 12 is a cross-sectional view of an example of the magneto-optical recording medium according to the present invention. As shown in FIG. 12, an undercoat layer 22 (a dielectric material layer), a recording layer 23 consisting of a first magnetic layer 23a and a second magnetic layer 23b, a protective layer 24 (a dielectric material layer), an organic protective layer or a joint layer 25 are successively overlaid on a substrate 21 in this order. It is not always necessary to provide the protective layer 24.

Preferable examples of the materials for the substrate 21 include plastics such as polycarbonate, amorphous polyolefin resin, epoxy resin, and methyl methacrylate resin; and glasses such as soda-lime glass, alumino-silicate glass, Vycor glass and Pyrex glass. Guide tracks for guiding a laser beam spot (an optical head) in the course of recording, erasing and reproduction operations or pregrooves for recording format information may be formed on the substrate 21. These guide tracks and minute pregrooves can be formed on the substrate 21 by the conventional methods such as the injection method or photo polymerization method (2P method). Alternatively, they can be directly formed on the glass plate by the photoresist method.

To protect the surface of the substrate 21 exposed to the laser beam from water and oxygen, the above surface of the substrate 21 may be overcoated with a dielectric layer, or a hydrophobic gas-resistant layer (for instance, a fluoroplastic layer).

The undercoat layer 22 is provided to prevent the magnetic properties of the recording layer 23 from being deteriorated by water and oxygen which otherwise enter the recording layer 23 from the outside through the substrate 21. In addition to this, the undercoat layer 22 has a function of enhancing the magneto-optical effects such as Kerr rotation angle ($\Theta k$) by the multiple reflection of light.

The optimal characteristics of the undercoat layer 22 for use in the present invention will now be discussed by referring to FIGS. 13 and 14.

Figure 13:
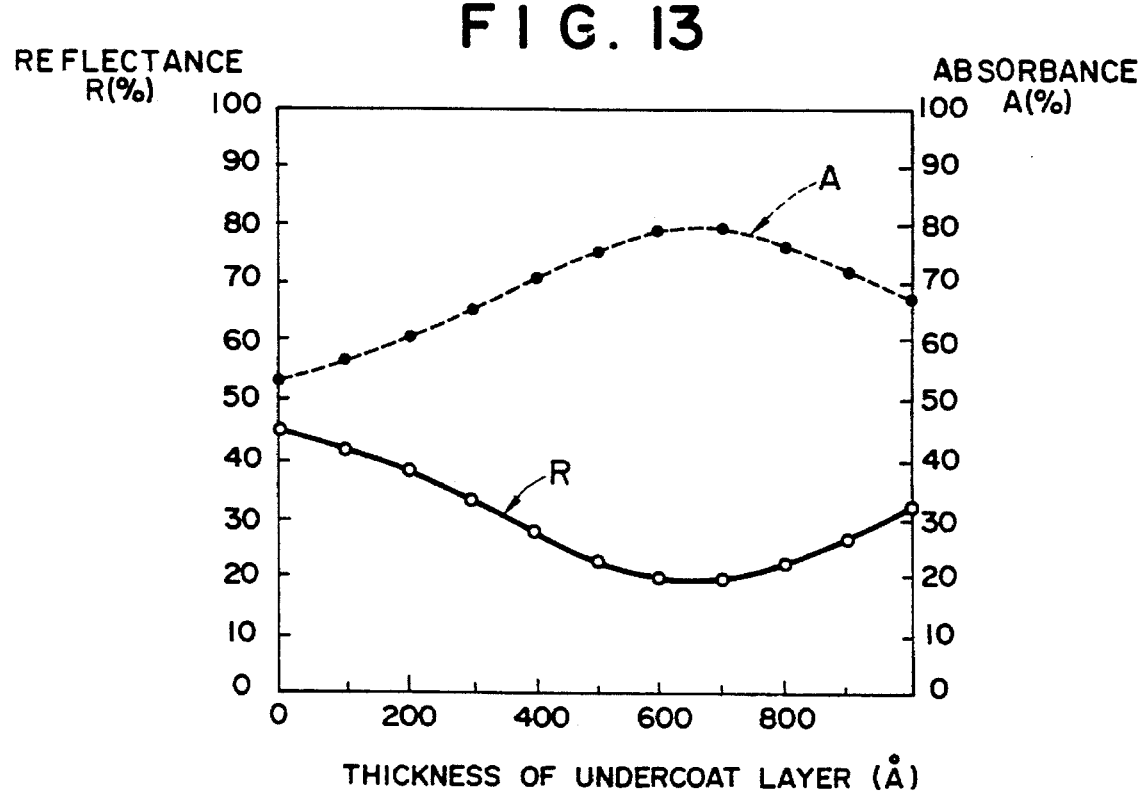
FIG. 13 is a graph showing the relationship among the thickness of an undercoat layer in a magneto-optical recording medium according to the present invention, the absorbance (A), and the reflectance (R)
Figure 14:
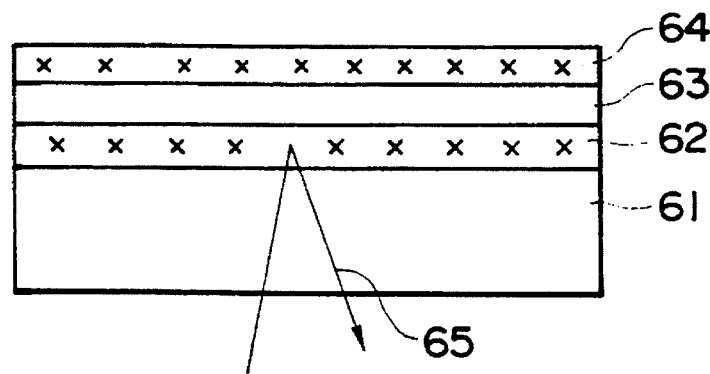
FIG. 14 is a cross-sectional view of a magneto-optical recording medium which is used in the measurement of data shown in FIG. 13.

In a magneto-optical recording medium as shown in FIG. 14, an undercoat layer 62 made of $Si_xN_y$, having a refractive index of 2.3, a magnetic layer 63 made of TbDyFeCo, and a protective layer 64 made of $Si_xN_y$ are successively overlaid on a glass substrate 61. A laser beam 65 is applied to this recording medium in such a manner as shown in FIG. 14. The thickness of the magnetic layer 63 is 700 Å. FIG. 13 is a graph showing the relationship among the thickness of the undercoat layer 62 which is illustrated in FIG. 14, the absorbance (A) and the reflectance (R) of the above undercoat layer.

As apparent from FIG. 13, the absorbance (A) of the undercoat layer 62 reaches the maximum value when the thickness thereof is in a range of 600 Å to 700 Å. Accordingly, the sensitivity to the laser beam for recording can be improved when the undercoat layer having a thickness of 600 Å to 700 Å is used in the magneto-optical recording medium.

Figure 15:
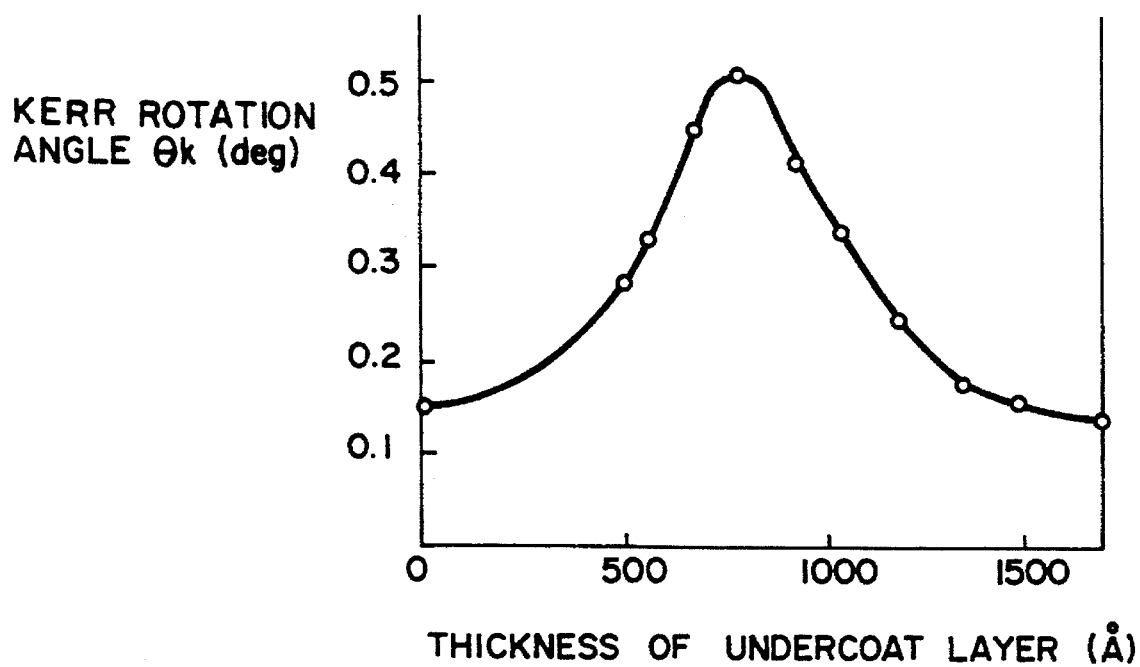
FIG. 15 is a graph showing the relationship between the thickness of an undercoat layer in a magneto-optical recording medium according to the present invention and the Kerr rotation angle ($\Theta k$)
Figure 19:
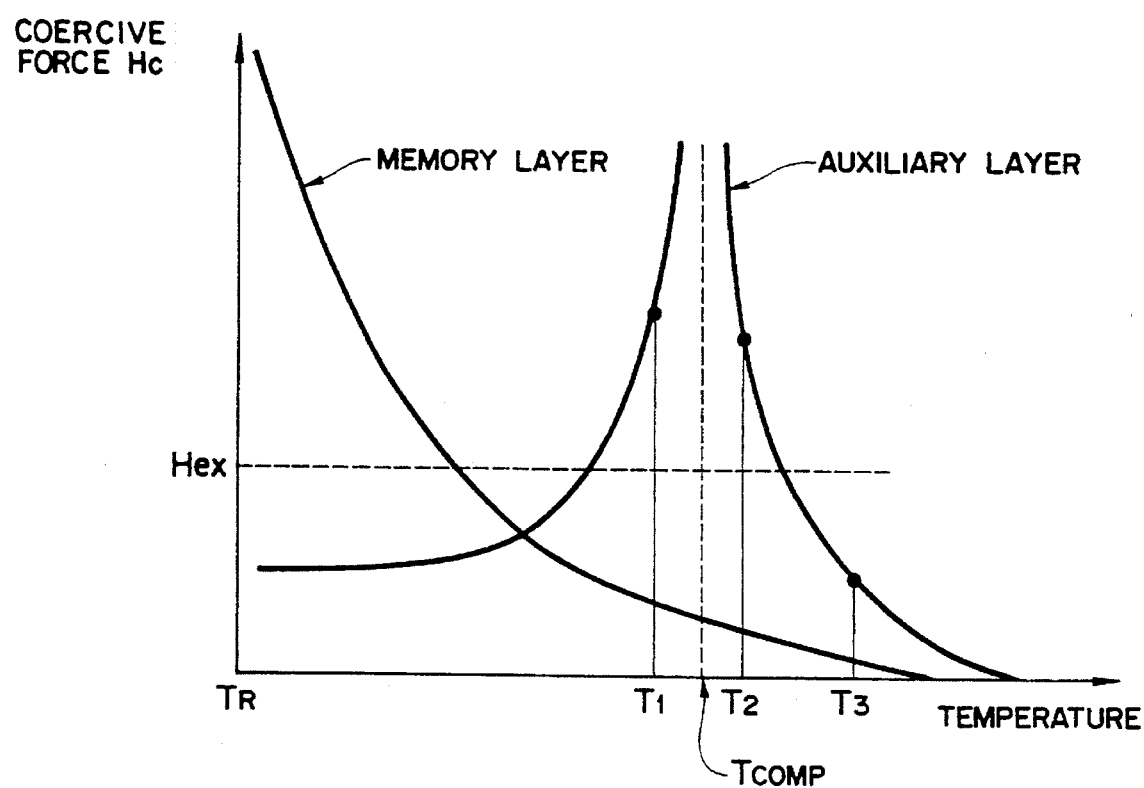
FIG. 19 is a graph showing the relationship between the coercive force (Hc) of two magnetic recording layers in the magneto-optical recording medium employed in FIG. 18 and the temperature.

FIG. 15 is a graph showing the relationship between the thickness of the undercoat layer (Å) and the Kerr rotation angle ($\Theta k$). This graph proves that the Kerr rotation angle ($\Theta k$) also becomes maximum owing to the enhancement effect of the multiple reflection of the undercoat layer when the thickness of the undercoat layer is in the range of about 600 Å to 700 Å, that is, the thickness for the maximum absorbance (A), as previously mentioned.

In addition to the above, FIG. 16 is a graph showing the relationship among the refractive index (n) of a dielectric material used in the undercoat layer, the absorbance (A) and the reflectance (R) of the undercoat layer. As can be seen from this graph, a maximum absorbance is obtained when the refractive index (n) of the dielectric material used in the undercoat layer is in the range of 2.5 to 2.7.

In the magneto-optical recording medium as shown in FIG. 12 according to the present invention, it is preferable that the thickness of the undercoat layer 22 be in the range of 500 Å to 1000 Å, more preferably, in the range of 600 Å to 900 Å. Furthermore, it is preferable that the refractive index of the undercoat layer 22 be 2.0 or more, and that the thermal conductivity thereof be 0.1 cal/cm.s.°C. or less from the viewpoint of heat-loss in the thermal conductivity.

With the thickness, refractive index and thermal conductivity of the undercoat layer 22 for use in the present invention taken into consideration, the following materials can be employed for the undercoat layer 22: $Si_xN_y$, $Si_xO_y$, AlN, ZrN, CrN, $Al_2O_3$, $TiO_2$, $Ta_2O_5$, ZnS, ZnO, MgO, $Al_2O_3$, AlON, ZrAlSiN, ZrAlSi, ZrSiO, ZrSiN, ZrAlN, ZrAlON, AlSiN, ZrAlSiNO, AlSiNO, $In_2O_3$, $ZrO_2$, $Ta_2O_5$ and $Cr_2O_3$. These materials can be used alone or in combination when the undercoat layer 22 is prepared. The undercoat layer 22 is formed on the substrate 21 by sputtering, vacuum-deposition or ion-plating.

The recording layer 23 as shown in FIG. 12 is constructed in such a manner that the first magnetic layer 23a and the second magnetic layer 23b are laminated, as previously mentioned. It is preferable that the thickness of each magnetic layer be in the range of 100 Å to 1000 Å, and thus, the total thickness of the recording layer 23 be in the range of 200 Å to 2000 Å. The first magnetic layer 23a and the second magnetic layer 23b can be formed by sputtering or vacuum-deposition on the substrate 21 and the first magnetic layer 23a, respectively.

The above-mentioned amorphous alloys can be employed for each magnetic layer. As a matter of course, other amorphous alloys which can satisfy the aforementioned requirements can also be used. For example, amorphous alloys which are composed of a metal selected from the group consisting of Fe and Co, and a metal selected from the group consisting of Gd, Tb, Dy, Er, Ho and Sm, and if necessary with addition thereto of a metal selected from the group consisting of Pt, Sn, Ni, Al, Ti, Zr, Au, Pm, Y, Nd, Ce, Rb, Nb, Rh, Pr, In, Ta, Cr, U, Sb and Si can be employed.

To decrease the coercive force of the second magnetic layer 23b (Hc2), or to control the temperature-dependent characteristics of the coercive force of the second magnetic layer 23b relative to those of the first magnetic layer 23a, Pt, Sn, Al, Ti or Ni may be added to the second magnetic layer 23b.

The protective layer 24 serves to accumulate in the recording layer 23 the thermal energy which is generated in the recording layer 23 by the application of the laser beam, without diffusing the energy therefrom. Furthermore, the protective layer 24 protects the recording layer 23 from oxidization and corrosion resulting from the contact with water and oxygen in the air. It is thus preferable that the thermal conductivity of the protective layer 24 be smaller than that of the undercoat layer 22. More specifically, a dielectric material having a thermal conductivity of $5 \times 10^{-2}$ cal/cm.s.C° or less may be preferably employed for the protective layer 24. The materials for the protective layer 24 may be the same as those employed in the undercoat layer 22. Among those materials, $Si_xN_y$, $Al_2O_3$, $SiO_2$, SiO, $ZrO_2$, ZrSiO, SiZrN and $Cr_2O_3$ are preferable. Furthermore, Ti, Pt, Cr, Nd or Mn may be added to the materials for the protective layer 24 to control its thermal conductivity. By the same film-forming method as employed in the undercoat layer 22, the protective layer 24 is formed on the second magnetic layer 23b in a thickness of 500 Å to 2000 Å.

On the protective layer 24, an organic protective layer or a joint layer 25 may be formed when necessary. The organic protective layer protects the lower layers thereunder, and the joint layer performs a function of adhering to another recording medium when employed in double-sided recording type magneto-optical recording medium. The organic protective layer or the joint layer 25 is prepared by coating a resin such as an epoxy resin, an ultraviolet-curing resin, a phenolic resin, an acrylic resin or a vinyl resin on the protective layer 24, in a thickness of 1 µm to 100 µm, by the spin coating method or heated-roller coating method.

When the double-sided recording type magneto-optical recording medium is prepared by sticking one magneto-optical recording medium in the form of a disc to the other one, it is preferable that the end portions of two discs be joined through a dielectric material or a plastic material.

The configuration of the magneto-optical recording medium according to the present invention is not limited to that shown in FIG. 12. For example, a magneto-optical recording medium without the organic protective layer 25 shown in FIG. 12 and a recording medium without the protective layer 24 shown in FIG. 12 may be used. In addition, a protective substrate with a thickness of 0.05 mm to 0.5 mm, made of polycarbonate, may be formed on the organic protective layer 25 to prevent the warpage of the recording medium. The properties of this protective substrate, such as stretchability resulting from the water absorption, linear expansion and compression stress are required to be substantially the same as those of the plastic substrate 21, so that it can prevent the warpage of the recording medium.

Furthermore, the magneto-optical recording medium with a configuration shown in FIG. 17 may be employed in the present invention. In this recording medium, a reflection layer (a heat-absorption layer) 26 is interposed between a protective layer 24 and an organic protective layer or a joint layer 25. In addition, a protective substrate 27, as previously mentioned, is formed on the organic protective layer or the joint layer 25.

By the aid of the above-mentioned reflection layer the magneto-optical effects of the magneto-optical recording medium can be further enhanced, and at the same time, the reflection layer 26 serves as a heat-absorption layer, which prevents the diffusion of thermal energy from the protective layer 24. More specifically, when the laser beam is applied to the recording medium for recording information, heat is generated in the recording layer 23 and conducted to the protective layer having a small thermal conductivity. The heat accumulated in the protective layer 24 is then conducted to the reflection layer 26, so that the wasteful diffusion of heat from the protective layer 24 can be prevented. The bit for recording information can be thus sharply formed, without leaving a long trail. The shape of the bit becomes fitted to the diameter of the laser beam spot. In contrast to this, when the reflection layer 26 is not provided on the protective layer 24, the heat is disadvantageously diffused from the protective layer 24, so that the bit is formed, leaving a long trail and the shape of the bit becomes thinner than the diameter of the laser beam spot.

with the heat absorption effect of the reflection layer taken into consideration, it is preferable that the thermal conductivity of the material for the reflection layer be 0.15 cal/cm.s.C° or more. Preferable examples of the materials for the reflection layer include Al, Pt, Au, Rh, Cu, Ag, Ni, Zr, Te, Nd, Fe, Zn, In and Cr, and alloys thereof. If the thermal conductivity of the reflection layer 26 is too high, heat-loss is also increased. Therefore, Ni, Cr, Pt, Zr and Te, and alloys thereof are more preferable because their thermal conductivity ranges from 0.15 to 0.3 cal/cm.s.C°.

The reflection layer 26 is coated on the protective layer 24 in a thickness of 200 Å to 1000 Å by sputtering or vacuum-deposition.

In the present invention, it is not always necessary to provide the reflection layer 26. It is recommended, however, that the reflection layer be provided in the case where a substrate 21 is made of glass. In such a case, the heat generated in the recording layer 23 is absorbed by the reflection layer 26 through the protective layer, so that the reflection layer 26 effectively prevents the thermal energy from diffusing in the horizontal direction of the surface of the protective layer 24.

The protective substrate 27 is employed to impart further improved abrasion-resistance and strength to mechanical damage to the magneto-optical recording medium, and prevent the warpage thereof. Specific examples of the materials for the protective substrate 27 are polycarbonate, amorphous polyolefin resin and epoxy resin.

Other features of this invention will become apparent in the course of the following description of exemplary embodiments, which are given for illustration of the invention and are not intended to be limiting thereof.

Example 1

An undercoat layer was formed on a disc-shaped polycarbonate substrate, with an outer diameter of 130 mm, an inner diameter of 15 mm and a thickness of 1.2 mm, by coating $Si_xN_y$ on the substrate in a thickness of 700 Å by the radio frequency (RF) sputtering method over a period of 15 to 50 minutes with the radio frequency power of 200 W to 500 W applied thereto under the conditions that a back pressure was set at $1.0 \times 10^{-6}$ Torr or less and an argon gas pressure was set at 3.0 mmTorr.

On the thus formed undercoat layer, a first magnetic layer was formed by coating an amorphous alloy of $(Tb_{50}Dy_{50})_{23.8}(Fe_{90}Co_{10})_{76.2}$ on the undercoat layer in a thickness of 300 Å by the radio frequency (RF) sputtering method over a period of 20 minutes with the radio frequency power of 200 W applied thereto under the conditions that a back pressure was set at $1.0 \times 10^{-6}$ Torr or less and an argon gas pressure was set at 3.0 mmTorr. A second magnetic layer was then formed by coating an amorphous alloy of $(Tb_{50}Dy_{50})_{28}(Fe_{82}Co_{18})_{72}$ on the first magnetic layer in a thickness of 300 Å under the same conditions as employed in the first magnetic layer.

On the thus formed second magnetic layer, a protective layer was formed by coating $Si_xN_y$ on the second magnetic layer in a thickness of 1000 Å by the radio frequency (RF) sputtering method over a period of 15 to 50 minutes with the radio frequency power of 200 W to 500 W applied thereto under the conditions that a back pressure was set at $1.0 \times 10^{-6}$ Torr or less and an argon gas pressure was set at 3.0 mmTorr.

On the thus formed protective layer, an organic protective layer was formed by coating a commercially available ultraviolet-curing resin, "UDAL-391K" (Trademark), made by Dainichiseika Color and Chemicals Mfg. Co., Ltd. on the protective layer in a thickness of 5 μm by the spin coating, and exposing the resin to ultraviolet light for curing. Thus, a magneto-optical recording medium No. 1 according to the present invention was obtained.

Examples 2 to 28

The process of preparing the magneto-optical recording medium employed in Example 1 was repeated except that the materials of the substrate, the undercoat layer, the first and second magnetic layers, the protective layer and the organic protective layer prepared in Example 1 were replaced by those shown in the following Tables 1 and 2, respectively, so that magneto-optical recording media No. 2 to No. 28 according to the present invention were obtained.

In the case where a reflection layer was interposed between the protective layer and the organic protective layer, Al, Pt, Au, Cr, Ni, or Zr was deposited by the electron beam deposition method over a period of 1 to 5 minutes.

TABLE 1

| Group | First Magnetic Layer | Second Magnetic Layer |
|---|---|---|
| 1 | $(Tb_{0.5}Dy_{0.5})_{23.8}(Fe_{0.92}Co_{0.08})_{76.2}$ | $(Tb_{0.5}Dy_{0.5})_{28}(Fe_{0.82}Co_{0.18})_{72}$ |
| 2 | $(Tb_{0.5}Dy_{0.5})_{24}(Fe_{0.9}Co_{0.1})_{76}$ | $(Tb_{0.4}Dy_{0.6})_{28}(Fe_{0.8}Co_{0.2})_{72}$ |
| 3 | $(Tb_{0.3}Dy_{0.7})_{24}(Fe_{0.87}Co_{0.13})_{76}$ | $(Tb_{0.5}Dy_{0.5})_{29}(Fe_{0.89}Co_{0.11})_{71}$ |
| 4 | $(Tb_{0.4}Dy_{0.6})_{23.5}(Fe_{0.9}Co_{0.1})_{76.5}$ | $(Tb_{0.4}Dy_{0.6})_{28}(Fe_{0.87}Co_{0.13})_{72}$ |
| 5 | $(Tb_{0.3}Dy_{0.7})_{23.8}(Fe_{0.9}Co_{0.1})_{76.2}$ | $(Tb_{0.4}Dy_{0.6})_{28}(Fe_{0.82}Co_{0.18})_{72}$ |
| 6 | $(Gd_{0.4}Dy_{0.6})_{24}(Fe_{0.95}Co_{0.05})_{76}$ | $(Gd_{0.65}Dy_{0.35})_{28}(Fe_{0.87}Co_{0.13})_{72}$ |
| 7 | $(Gd_{0.3}Dy_{0.7})_{24.5}(Fe_{0.95}Co_{0.05})_{75.5}$ | $(Tb_{0.4}Dy_{0.6})_{33}(Fe_{0.82}Co_{0.18})_{67}$ |
| 8 | $Tb_{21}(Fe_{0.93}Co_{0.07})_{79}$ | $(Tb_{0.4}Dy_{0.6})_{33}(Fe_{0.72}Co_{0.28})_{67}$ |
| 9 | $Tb_{20.5}(Fe_{0.96}Co_{0.04})_{79.5}$ | $(Tb_{0.4}Dy_{0.6})_{33}(Fe_{0.79}Co_{0.21})_{67}$ |
| 10 | $(Tb_{0.4}Dy_{0.6})_{24}(Fe_{0.9}Co_{0.1})_{76}$ | $(Tb_{0.67}Ho_{0.33})_{33}(Fe_{0.7}Co_{0.3})_{67}$ |
| 11 | $Tb_{21}(Fe_{0.96}Co_{0.04})_{79}$ | $(Gd_{0.5}Dy_{0.5})_{28}(Fe_{0.89}Co_{0.11})_{72}$ |
| 12 | $Tb_{19.5}Fe_{80.5}$ | $(Gd_{0.4}Dy_{0.6})_{28}(Fe_{0.87}Co_{0.13})_{72}$ |
| 13 | $Tb_{20.5}Dy_{79.5}$ | $(Gd_{0.4}Dy_{0.6})_{29}(Fe_{0.87}Co_{0.13})_{71}$ |
| 14 | $(Tb_{0.7}Ho_{0.3})_{23.5}(Fe_{0.88}Co_{0.12})_{76.5}$ | $(Gd_{0.6}Ho_{0.4})_{32}(Fe_{0.8}Co_{0.2})_{68}$ |
| 15 | $(Tb_{0.43}Dy_{0.57})_{23}(Fe_{0.92}Co_{0.08})_{77}$ | $(Tb_{0.18}Dy_{0.82})_{33}(Fe_{0.81}Co_{0.19})_{67}$ |
| 16 | $Dy_{22}(Fe_{0.93}Co_{0.07})_{78}$ | $Gd_{0.77}Dy_{0.23})_{30}(Fe_{0.87}Co_{0.13})_{70}$ |
| 17 | $(Gd_{0.31}Dy_{0.69})_{26}(Fe_{0.95}Co_{0.05})_{74}$ | $Gd_{0.77}Dy_{0.23})_{30}(Fe_{0.94}Co_{0.06})_{67}Sn_3$ |
| 18 | $(Tb_{0.64}Dy_{0.36})_{33}(Fe_{0.78}Co_{0.22})_{67}$ | $(Gd_{0.76}Dy_{0.24})_{33}(Fe_{0.94}Co_{0.06})_{67}$ |
| 19 | $(Tb_{0.2}Er_{0.8})_{30}(Fe_{0.86}Co_{0.14})_{70}$ | $(Gd_{0.67}Ho_{0.33})_{27}(Fe_{0.89}Co_{0.11})_{73}$ |
| 20 | $(Tb_{0.38}Dy_{0.62})_{26}(Fe_{0.89}Co_{0.11})_{74}$ | $(Tb_{0.64}Ho_{0.36})_{33}(Fe_{0.7}Co_{0.3})_{67}$ |
| 21 | $(Tb_{0.75}Ho_{0.25})_{33}(Fe_{0.82}Co_{0.18})_{67}$ | $(Tb_{0.42}Dy_{0.58})_{26}(Fe_{0.83}Co_{0.17})_{71}P_3$ |
| 22 | $(Tb_{0.64}Dy_{0.36})_{33}(Fe_{0.78}Co_{0.21})_{67}$ | $(Gd_{0.76}Dy_{0.24})_{33}(Fe_{0.94}Co_{0.06})_{67}$ |
| 23 | $(Tb_{0.57}Dy_{0.43})_{24.5}(Fe_{0.92}Co_{0.08})_{75.5}$ | $(Gd_{0.63}Dy_{0.37})_{27}(Fe_{0.85}Co_{0.15})_{73}$ |
| 24 | $(Tb_{0.31}Dy_{0.69})_{25.5}(Fe_{0.89}Co_{0.11})_{74.5}$ | $(Gd_{0.29}Dy_{0.71})_{28}(Fe_{0.88}Co_{0.12})_{72}$ |
| 25 | $(Tb_{0.2}Dy_{0.8})_{25}(Fe_{0.92}Co_{0.08})_{75}$ | $(Gd_{0.36}Dy_{0.64})_{27.5}(Fe_{0.88}Co_{0.12})_{72.5}$ |
| 26 | $(Tb_{0.24}Dy_{0.76})_{25.5}(Fe_{0.92}Co_{0.08})_{74.5}$ | $(Gd_{0.32}Dy_{0.68})_{28}(Fe_{0.88}Co_{0.12})_{72}$ |
| 27 | $Dy_{0.2}(Fe_{0.8}Co_{0.2})_{0.8}$ | $(Gd_{0.7}Dy_{0.3})_{23}(Fe_{0.9}Co_{0.1})_{76}$ |
| 28 | $(Tb_{0.3}Dy_{0.7})_{23.5}(Fe_{0.9}Co_{0.1})_{76.5}$ | $(Gd_{0.8}Dy_{0.2})_{22}(Fe_{0.9}Co_{0.1})_{78}$ |

TABLE 2

| | Substrate | Recording Layer | Undercoat Layer | Protective Layer | Reflection Layer | Organic Protective Layer |
|---|---|---|---|---|---|---|
| Example 1 | Polycarbonate | Group 1 (300Å,300Å)** | $Si_xN_y$ (700Å)* | $Si_xN_y$ (1000Å) | — | UV-curing resin(5 μm) |
| Example 2 | Polycarbonate | Group 2 (300Å,300Å) | $Si_xN_y$ (700Å) | ZrSiN (1000Å) | — | UV-curing resin(5 μm) |
| Example 3 | Soda-aluminum glass | Group 3 (300Å,300Å) | $Si_xN_y$ (700Å) | $ZrO_2$ (1000Å) | Al (500Å) | UV-curing resin(5 μm) |
| Example 4 | Polycarbonate | Group 4 (300Å,300Å) | AlSiNo (700Å) | $Si_xO_y.Ta_2O_5$ (1000Å) | — | UV-curing resin(5 μm) |
| Example 5 | Polycarbonate | Group 5 (300Å,300Å) | AlSiNo (700Å) | $Si_xO_y.Al_2O_3$ (1000Å) | — | UV-curing resin(5 μm) |
| Example 6 | Polycarbonate | Group 6 (300Å,300Å) | AlON (700Å) | $Si_xO_y.Si_xN_y$ (1000Å) | Pt (500Å) | UV-curing resin(5 μm) |
| Example 7 | Glass | Group 7 (300Å,300Å) | ZnS (700Å) | $ZrSiN-Si_xN_y$ (1000Å) | Au (500Å) | UV-curing resin(5 μm) |
| Example 8 | Polycarbonate | Group 8 (300Å,300Å) | $Si_xN_y$ (700Å) | $Si_xN_y$ (1000Å) | — | UV-curing resin(5 μm) |
| Example 9 | α-polyolefin | Group 9 (300Å,200Å) | SiAlN (700Å) | SiAlN (1000Å) | Al (400Å) | UV-curing resin(10 μm) |
| Example 10 | Glass | Group 10 (300Å,200Å) | $Si_xN_y$ (700Å) | $Si_xN_y$ (1000Å) | — | UV-curing resin(10 μm) |
| Example 11 | Glass | Group 11 (300Å,200Å) | $Si_xN_y$ (700Å) | $Si_xN_y$ (1000Å) | Au (400Å) | UV-curing resin(5 μm) |
| Example 12 | Glass | Group 12 (200Å,100Å) | ZnS (700Å) | $Si_xN_y$ (1000Å) | Cr (400Å) | UV-curing resin(5 μm) |
| Example 13 | Polycarbonate | Group 13 (400Å,300Å) | ZrSiN (800Å) | ZrSiN (1000Å) | — | UV-curing resin(10 μm) |
| Example 14 | Polycarbonate | Group 14 (300Å,200Å) | ZrAlSi (700Å) | ZrAlSi (1000Å) | Pt (400Å) | UV-curing resin(10 μm) |
| Example 15 | Polycarbonate | Group 15 (500Å,500Å)** | $Si_xN_y$ (800Å)* | $Si_xN_y$ (800Å) | — | UV-curing resin(10 μm) |
| Example 16 | Polycarbonate | Group 16 (500Å,500Å) | AlSiN (800Å) | AlSiN (800Å) | Pt (400Å) | UV-curing resin(10 μm) |
| Example 17 | Glass | Group 17 (500Å,500Å) | $Si_xN_y$ (800Å) | $Si_xN_y$ (800Å) | — | UV-curing resin(10 μm) |
| Example 18 | α-polyolefin | Group 18 (500Å,500Å) | $Si_xN_y$ (800Å) | $Si_xN_y$ (800Å) | — | UV-curing resin(10 μm) |
| Example 19 | α-polyolefin | Group 19 (500Å,500Å) | ZrSiN (800Å) | ZrSiN (800Å) | — | UV-curing resin(10 μm) |
| Example 20 | Polycarbonate | Group 20 (500Å,500Å) | ZnS (700Å) | $Si_xO_y$ (800Å) | Au (400Å) | UV-curing resin(10 μm) |
| Example 21 | Glass | Group 21 (500Å,500Å) | AlSiNO (800Å) | AlSiNO (800Å) | — | UV-curing resin(10 μm) |
| Example 22 | Polycarbonate | Group 22 (300Å,600Å) | $Si_xN_y$ (800Å) | $Si_xN_y$ (800Å) | — | UV-curing resin(10 μm) |
| Example 23 | Epoxy | Group 23 (300Å,300Å) | $Si_xN_y$ (700Å) | $Si_xN_y$ (700Å) | — | Epoxy acrylate (10 μm) |
| Example 24 | Polycarbonate | Group 24 (300Å,300Å) | $Al_2O_3.2SiO_2$ (700Å) | $Al_2O_3.2SiO_2$ (700Å) | — | Polyester (10 μm) |
| Example 25 | Alumino-silicate soda-lime glass | Group 25 (200Å,200Å) | $Si_xN_y$ (700Å) | $Si_xN_y$ (700Å) | Al (300Å) | Polyester (10 μm) |
| Example 26 | Alumino-silicate soda-lime glass | Group 26 (200Å,200Å) | $Si_xO_y$ (700Å) | $Si_xO_y$ (700Å) | Au (300Å) | Polyester (10 μm) |
| Example 27 | Polycarbonate | Group 27 (200Å,200Å) | $Si_xN_y$ (800Å) | $Si_xN_y$ (600Å) | Al-Ni alloy (300Å) | UV-curing resin(10 μm) |
| Example 28 | Polycarbonate | Group 28 (200Å,200Å) | $Si_xN_y$ (800Å) | $Si_xN_y$ (600Å) | Al-Ni alloy (300Å) | UV-curing resin(10 μm) |

*The figures in parentheses indicate the thickness of the layer.
**The left-hand figures and the right-hand figures in parentheses indicate the thickness of a first magnetic layer and that of a second magnetic layer, respectively.

The thermal magnetic characteristics of each alloy composition which is used in the first and second magnetic layers of the magneto-optical recording media No. 1 to No. 28 are shown in Table 3.

In the compensation composition of TbDyFeCo, when the Co content is 10 atom %, the content of total rare earth metals is about 24.5 atom %. In the compensation composition of GdDyFeCo, when the Co content is 10 atom %, the content of total rare earth metals is about 25.5 atom %. In the compensation composition of TbFeCo, when the Co content is 10 atom %, the content of the rare earth metal is about 21 atom %.

The magneto-optical recording media No. 1 to No. 28 according to the present invention were subjected to recording, erasing and reproduction tests.

For recording and erasing information, the power of a single laser beam was switched as shown in Table 4. The signal for recording information whose frequency was 10

MHz was modulated to 15 MHz for the signal for erasing the same, so that information was recorded and erased by the overwriting operation at a duty cycle of 50%.

The direction of a bias magnetic field applied to each recording medium was constant throughout the recording operation and erasing operation. The direction of the bias magnetic field applied to the magneto-optical recording medium (type-A) was reverse to the direction of that applied to the magneto-optical recording medium (type-B). Other test conditions are shown in Table 4.

TABLE 3

| Example No. | First Magnetic Layer | | | | Second Magnetic Layer | | | | Type of Magneto-Optical Recording Medium |
|---|---|---|---|---|---|---|---|---|---|
| | Curie Temperature (°C.) | Compensation Temperature (°C.) | Coercive Force (kOe) At Room Temperature | (*) At $T_L$ | Curie Temperature (°C.) | Compensation Temperature (°C.) | Coercive Force (kOe) At Room Temperature | At $T_L$ | |
| 1 | 140 | Room Temperature or lower | 5 | <0.3 | 190 | 150 | 1.0 | 1.0 | A |
| 2 | 150 | " | 6 | <0.3 | 190 | 150 | 1.2 | 1.3 | A |
| 3 | 150 | " | 7 | <0.3 | 150 | 150 | 1.4 | 1.4 | A |
| 4 | 150 | " | 6 | <0.3 | 170 | 150 | 1.5 | 1.4 | A |
| 5 | 140 | " | 5 | <0.3 | 180 | 130 | 1.1 | 1.0 | A |
| 6 | 160 | " | 5 | <0.5 | 200 | 130 | 1.0 | 1.0 | A |
| 7 | 150 | " | 5 | <0.5 | 170 | 130 | 1.0 | 1.0 | A |
| 8 | 165 | " | 7 | <0.5 | 210 | 160 | 1.4 | 1.3 | A |
| 9 | 150 | " | 5 | <0.3 | 200 | 160 | 1.0 | 1.0 | A |
| 10 | 140 | " | 5 | <0.3 | 210 | 160 | 1.0 | 1.0 | A |
| 11 | 140 | " | 8 | <0.3 | 195 | 160 | 1.1 | 1.1 | A |
| 12 | 130 | " | 5 | <0.3 | 210 | 160 | 1.2 | 1.1 | A |
| 13 | 130 | " | 7 | <0.3 | 220 | 150 | 1.1 | 1.1 | A |
| 14 | 130 | " | 5 | <0.3 | 170 | 140 | 0.3 | 0.7 | A |
| 15 | 140 | " | 3.5 | Approx. 0.2 | 200 | 160 | 0.5 | 0.6 | A |
| 16 | 120 | " | 2.5 | Approx. 0 | 230 | 170 | 0.5 | 0.6 | A |
| 17 | 160 | " | 2 | Approx. 0 | 250 | 170 | 0.3 | 0.4 | B |
| 18 | 160 | " | 3 | Approx. 0.3 | 240 | 160 | 0.5 | 0.7 | B |
| 19 | 140 | " | 5 | Approx. 0 | 200 | 140 | 0.5 | 0.6 | B |
| 20 | 140 | " | 3 | Approx. 0 | 200 | 140 | 0.8 | 0.9 | B |
| 21 | 140 | " | 3 | Approx. 0 | 220 | 150 | 0.4 | 0.5 | B |
| 22 | 150 | " | 3 | Approx. 0 | 240 | 170 | 0.5 | 0.4 | B |
| 23 | 155 | " | 5.5 | Approx. 0 | 240 | 160 | 0.7 | 0.6 | B |
| 24 | 140 | " | 3.2 | Approx. 0 | 195 | 140 | 0.5 | 0.4 | B |
| 25 | 135 | " | 3.7 | Approx. 0 | 195 | 130 | 0.7 | 0.6 | B |
| 26 | 140 | " | 5 | Approx. 0 | 205 | 140 | 0.5 | 0.4 | B |
| 27 | 140 | " | 3.5 | Approx. 0 | 240 | — | 0.9 | 1.1 | C |
| 28 | 140 | " | 5.0 | Approx. 0 | 250 | — | 0.8 | 1.0 | C |

(*)$T_L$ means a lower operation temperature.

TABLE 4

| Example No. | Power of Laser Beam | | Operation Temperature | | Bias Magnetic Field [Hex] (Oe) | Linear Velocity (m/sec) | Rotating Speed (rpm) |
|---|---|---|---|---|---|---|---|
| | $[P_L]$ (mW) | $[P_H]$ (mW) | For Writing $[T_L$ or $T_H]$ (°C.) | For Erasing $[T_L$ or $T_H]$ (°C.) | | | |
| 1 | 4 | 8 | Approx. 130(L) | Approx. 180(H) | 1500 | 22.2 | 3600 |
| 2 | 5 | 9 | Approx. 140(L) | Approx. 190(H) | " | " | " |
| 3 | 7 | 11 | Approx. 155(H) | Approx. 130(L) | " | " | " |

TABLE 4-continued

| Example No. | Power of Laser Beam | | Operation Temperature | | Bias Magnetic Field [Hex] (Oe) | Linear Velocity (m/sec) | Rotating Speed (rpm) |
|---|---|---|---|---|---|---|---|
| | $[P_L]$ (mW) | $[P_H]$ (mW) | For Writing $[T_L$ or $T_H]$ (°C.) | For Erasing $[T_L$ or $T_H]$ (°C.) | | | |
| 4 | 5 | 9 | Approx. 140(L) | Approx. 190(H) | " | " | " |
| 5 | 4 | 7.5 | Approx. 169(H) | Approx. 130(L) | " | " | " |
| 6 | 6 | 10 | Approx. 140(L) | Approx. 190(H) | " | " | " |
| 7 | 7 | 12 | Approx. 130(L) | Approx. 180(H) | " | " | " |
| 8 | 5.5 | 9 | Approx. 140(L) | Approx. 190(H) | " | " | " |
| 9 | 5.5 | 9 | Approx. 140(L) | Approx. 180(H) | " | " | " |
| 10 | 4 | 8 | Approx. 180(H) | Approx. 130(L) | " | " | " |
| 11 | 7 | 11 | Approx. 130(L) | Approx. 180(H) | " | " | " |
| 12 | 7 | 13 | Approx. 130(L) | Approx. 190(H) | " | " | " |
| 13 | 4 | 8 | Approx. 130(L) | Approx. 180(H) | " | " | " |
| 14 | 4 | 7.5 | Approx. 130(L) | Approx. 160(H) | " | " | " |
| 15 | 6 | 11 | Approx. 130(L) | Approx. 180(H) | " | " | " |
| 16 | 7 | 14 | Approx. 120(L) | Approx. 200(H) | " | " | " |
| 17 | 9 | 16 | Approx. 120(L) | Approx. 210(H) | " | " | " |
| 18 | 9 | 14 | Approx. 140(L) | Approx. 210(H) | " | " | " |
| 19 | 5 | 10 | Approx. 120(L) | Approx. 180(H) | " | " | " |
| 20 | 7 | 11 | Approx. 130(L) | Approx. 180(H) | " | " | " |
| 21 | 6 | 12 | Approx. 130(L) | Approx. 200(H) | " | " | " |
| 22 | 7 | 14 | Approx. 140(L) | Approx. 210(H) | " | " | " |
| 23 | 7 | 14 | Approx. 140(L) | Approx. 210(H) | " | " | " |
| 24 | 6 | 14 | Approx. 140(L) | Approx. 190(H) | " | " | " |
| 25 | 7 | 11 | Approx. 130(L) | Approx. 180(H) | " | " | " |
| 26 | 7 | 13 | Approx. 130(L) | Approx. 190(H) | " | " | " |
| 27 | 6 | 13 | Approx. 130(L) | Approx. 210(H) | " | " | " |
| 28 | 6 | 13 | Approx. 130(L) | Approx. 210(H) | " | " | " |

As can be seen from Table 4, the magneto-optical recording media No. 1 to No. 28 according to the present invention can realize to record and erase information continuously by the overwrite operation at a high linear velocity, using a single laser beam with a relatively small power. In the course of the overwrite operation, it was unnecessary to reverse the direction of the bias magnetic field applied to the recording medium. Furthermore, the C/N ratio of the reproduction operation attained to as good as 50 dB or more and the bit length for recording was as short as 0.85 mm or less.

TABLE 5

| Example No. | Power of Laser Beam for Reproduction (mW) | C/N ratio (dB) | Bit Length (μm) |
|---|---|---|---|
| 1 | 1.5 | 50 | 0.75 |
| 2 | " | 50 | 0.75 |
| 3 | " | 52 | 0.70 |
| 4 | " | 50 | 0.75 |
| 5 | " | 50 | 0.75 |
| 6 | " | 50 | 0.75 |
| 7 | " | 53 | 0.70 |
| 8 | " | 50 | 0.75 |
| 9 | " | 50 | 0.75 |
| 10 | " | 50 | 0.75 |
| 11 | " | 52 | 0.70 |
| 12 | " | 52 | 0.70 |
| 13 | " | 50 | 0.75 |
| 14 | " | 50 | 0.75 |
| 15 | " | 50 | 0.75 |
| 16 | " | 52 | 0.75 |
| 17 | " | 53 | 0.70 |
| 18 | " | 53 | 0.75 |
| 19 | " | 50 | 0.75 |
| 20 | " | 51 | 0.75 |
| 21 | " | 50 | 0.70 |
| 22 | " | 50 | 0.75 |
| 23 | " | 50 | 0.80 |
| 24 | " | 50 | 0.80 |
| 25 | " | 52 | 0.80 |

TABLE 5-continued

| Example No. | Power of Laser Beam for Reproduction (mW) | C/N ratio (dB) | Bit Length (μm) |
|---|---|---|---|
| 26 | " | 52 | 0.80 |
| 27 | " | 50 | 0.85 |
| 28 | " | 50 | 0.85 |

As previously mentioned, the magneto-optical recording method according to the present invention is capable of performing the overwrite operation simply by switching the power of a laser beam which is employed to record and erase information. In the course of recording and erasing information, the direction of a bias magnetic field applied to the magneto-optical recording medium may not be changed depending on the recording and erasing operations. This recording method can thus realize the magneto-optical recording at a high linear velocity.

The conventional magneto-optical recording method capable of overwriting information by changing the power of a single laser beam requires the step of initializing the recording medium, so that an auxiliary magnet must be employed. The magneto-optical recording method according to the present invention, however, neither includes such additional initializing step, nor necessitates the auxiliary magnet. Accordingly, the size of the magneto-optical recording head for the recording medium according to the present invention can be minimized.

In addition to the above advantages, the access time can be shortened when a single laser beam is employed.

What is claimed is:

1. A method of magneto-optical recording and erasing information onto a magneto-optical recording medium comprising the steps of:

(a) providing said recording medium with first and second magnetic layers laminated one on the other, said medium having a recording operation temperature to which the medium is heated for recording and an erasing operation temperature to which the medium is heated for erasing, one of said operation temperatures being higher than the other, each of said layers having a perpendicular magnetization direction, a compensation temperature, a Curie temperature, and a temperature-dependent coercive force, the compensation temperature of said first magnetic layer being lower than that of said second magnetic layer, the coercive force of said first magnetic layer being larger than that of said second layer at room temperature but smaller than that of said second magnetic layer at each of said operation temperatures, the lower of said operation temperatures being close to the Curie temperature of the first layer, and the higher of said operation temperatures being close to the Curie temperature of the second layer;

(b) recording information at an area on the medium by
  (i) applying, to said area, a laser beam at a first power level corresponding to said recording operation temperature to heat the medium at said area to said recording operation temperature,
  (ii) applying, to the medium at said area, an external magnetic biasing field with a predetermined magnetization direction, and
  (iii) cooling said area to room temperature to establish a recorded bit of information at said area; and (c) erasing a pre-established bit of information from an area on the medium by
  (i) changing the power level of the laser beam to a second power level, different from said first power level, corresponding to said erasing operation temperature,
  (ii) applying, to said last-mentioned area, the laser beam at said second power level to heat the medium at said last-mentioned area to said erasing operation temperature,
  (iii) applying, to the medium at said last-mentioned area, said external magnetic biasing field with said predetermined magnetization direction, and
  (iv) cooling said last-mentioned area to room temperature to erase said pre-established bit of information;

wherein:

(d) said recording and erasing are performed without applying an initializing magnetic field to the medium;

(e) the higher of said operation temperatures is a temperature such that heating of the recording medium thereto causes the coercive force of the first layer to be smaller than that of the second layer, and the lower of said operation temperatures is a temperature such that heating of the recording medium thereto causes exchange coupling force between the first and second layers to be decreased;

(f) at the lower of said operation temperatures, the coercive force of said second layer is smaller than said external magnetic biasing field;

(g) when the recording operation temperature is the higher of said operation temperatures, said predetermined magnetization direction for both recording and erasing is the same as the magnetized direction of the second layer in the state in which information is erased; and (h) when the recording operation temperature is the lower of said operation temperatures, said predetermined magnetization direction for both recording and erasing is opposite to the magnetized direction of the second layer in the state in which information is erased.

2. The magneto-optical recording method as claimed in claim 1, wherein a laser beam of single beam type is applied to said magneto-optical recording medium in the recording and erasing steps.

3. The magneto-optical recording method as claimed in claim 1, wherein a laser beam of two-beam type is applied to said magneto-optical recording medium in the recording and erasing steps.

4. The magneto-optical recording method as claimed in claim 1, wherein each of said first and second magnetic layers of said magneto-optical recording medium is a perpendicularly anisotropic alloy layer comprising an amorphous alloy of a rare earth metal and a transition metal, and the magnetic moment of said rare earth metal is predominant in said first and second magnetic layers at room temperature.

5. The magneto-optical recording method as claimed in claim 1, wherein each of said first and second magnetic layers of said magneto-optical recording medium is a perpendicularly anisotropic alloy layer comprising an amorphous alloy of a rare earth metal and a transition metal, and the magnetic moment of said transition metal is predominant in said first magnetic layer at room temperature, and the magnetic moment of said rare earth metal is predominant in said second magnetic layer at room temperature.

6. The magneto-optical recording method as claimed in claim 1, wherein each of said first and second magnetic layers of said magneto-optical recording medium is a perpendicularly anisotropic alloy layer comprising an amorphous alloy of a rare earth metal and a transition metal, and the magnetic moment of said transition metal is predominant in said first and second magnetic layers at room temperature.

7. The magneto-optical recording method as claimed in claim 4, wherein during both recording and erasing, a bias magnetic field having the same magnetization direction as that of the magnetization of said second magnetic layer in an erased state is applied to said magneto-optical recording medium, and recording is performed by applying a laser beam having a power corresponding to said higher operation temperature, and erasing is performed by applying a laser beam having a power corresponding to said lower operation temperature.

8. The magneto-optical recording method as claimed in claim 4, wherein during both recording and erasing, a bias magnetic field having an opposite magnetization direction to that of the magnetization of said second magnetic layer in an erased state is applied to said magneto-optical recording medium, and recording is performed by applying a laser beam having a power corresponding to said lower operation temperature, and erasing is performed by applying a laser beam having a power corresponding to said higher operation temperature.

9. A method of magneto-optical recording and erasing information onto a magneto-optical recording medium comprising the steps of:

(a) providing said recording medium with first and second magnetic layers laminated one on the other, said medium having a recording operation temperature to which the medium is heated for recording and an erasing operation temperature to which the medium is heated for erasing, one of said operation temperatures being higher than the other, each of said layers having a perpendicular magnetization direction, a compensation temperature, a Curie temperature, and a temperature-dependent coercive force, the coercive force of said first magnetic layer being larger than that of said second layer at room temperature but smaller than that of said second magnetic layer at each of said operation temperatures, the lower of said operation temperatures being lower than the compensation temperature of the second layer and lower than the Curie temperature of the first layer, and the higher of said operation temperatures being lower than the Curie temperature of the second layer;

(b) recording information at an area on the medium by
  (i) applying, to said area, a laser beam at a first power level corresponding to said recording operation temperature to heat the medium at said area to said recording operation temperature,
  (ii) applying, to the medium at said area, an external magnetic biasing field with a predetermined magnetization direction, and
  (iii) cooling said area to room temperature to establish a recorded bit of information at said area; and (c) erasing a pre-established bit of information from an area on the medium by
  (i) changing the power level of the laser beam to a second power level, different from said first power level, corresponding to said erasing operation temperature,
  (ii) applying, to said last-mentioned area, the laser beam at said second power level to heat the medium at said last-mentioned area to said erasing operation temperature,
  (iii) applying, to the medium at said last-mentioned area, said external magnetic biasing field with said predetermined magnetization direction, and
  (iv) cooling said last-mentioned area to room temperature to erase said pre-established bit of information;

wherein:

(d) said recording and erasing are performed without applying an initializing magnetic field to the medium;

(e) the higher of said operation temperatures is a temperature such that heating of the recording medium thereto causes the coercive force of the first layer to be smaller than that of the second layer, and the lower of said operation temperatures is a temperature such that heating of the recording medium thereto causes exchange coupling force between the first and second layers to be decreased;

(f) at the lower of said operation temperatures, the coercive force of said second layer is smaller than said external magnetic biasing field;

(g) when the recording operation temperature is the higher of said operation temperatures, said predetermined magnetization direction for both recording and erasing is the same as the magnetized direction of the second layer in the state in which information is erased; and (h) when the recording operation temperature is the lower of said operation temperatures, said predetermined magnetization direction for both recording and erasing is opposite to the magnetized direction of the second layer in the state in which information is erased.

10. The magneto-optical recording method as claimed in claim 9, wherein a laser beam of single beam type is applied to said magneto-optical recording medium in the recording and erasing steps.

11. The magneto-optical recording method as claimed in claim 9, wherein a laser beam of two-beam type is applied to said magneto-optical recording medium in the recording and erasing steps.

12. The magneto-optical recording method as claimed in claim 9, wherein each of said first and second magnetic layers of said magneto-optical recording medium is a perpendicularly anisotropic alloy layer comprising an amorphous alloy of a rare earth metal and a transition metal, and the magnetic moment of said rare earth metal is predominant in said first and second magnetic layers at room temperature.

13. The magneto-optical recording method as claimed in claim 9, wherein each of said first and second magnetic layers of said magneto-optical recording medium is a perpendicularly anisotropic alloy layer comprising an amorphous alloy of a rare earth metal and a transition metal, and the magnetic moment of said transition metal is predominant in said first magnetic layer at room temperature, and the magnetic moment of said rare earth metal is predominant in said second magnetic layer at room temperature.

14. The magneto-optical recording method as claimed in claim 9, wherein each of said first and second magnetic layers of said magneto-optical recording medium is a perpendicularly anisotropic alloy layer comprising an amorphous alloy of a rare earth metal and a transition metal, and the magnetic moment of said transition metal is predominant in said first and second magnetic layers at room temperature.

15. The magneto-optical recording method as claimed in claim 12, wherein during both recording and erasing, a bias magnetic field having the same magnetization direction as that of the magnetization of said second magnetic layer in an erased state is applied to said magneto-optical recording medium, and recording is performed by applying a laser beam having a power corresponding to said higher operation temperature, and erasing is performed by applying a laser beam having a power corresponding to said lower operation temperature.

16. The magneto-optical recording method as claimed in claim 12, wherein during both recording and erasing, a bias magnetic field having an opposite magnetization direction to that of the magnetization of said second magnetic layer in an erased state is applied to said magneto-optical recording medium, and recording is performed by applying a laser beam having a power corresponding to said lower operation temperature, and erasing is performed by applying a laser beam having a power corresponding to said higher operation temperature.

* * * * *